US008723466B2

(12) United States Patent
Chambers et al.

(10) Patent No.: US 8,723,466 B2
(45) Date of Patent: May 13, 2014

(54) MOTORIZED VENETIAN BLIND SYSTEM

(75) Inventors: Samuel F. Chambers, Gwynedd Valley, PA (US); William Bryce Fricke, Bethlehem, PA (US); Matthew R. Hontz, Allentown, PA (US); David A. Kirby, Emmaus, PA (US); Justin J. Mierta, Allentown, PA (US); Jonathan Carl Sevy, Easton, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 93 days.

(21) Appl. No.: 13/233,883

(22) Filed: Sep. 15, 2011

(65) Prior Publication Data
US 2012/0125543 A1    May 24, 2012

Related U.S. Application Data

(60) Provisional application No. 61/384,005, filed on Sep. 17, 2010.

(51) Int. Cl.
*H02H 7/08*   (2006.01)
(52) U.S. Cl.
USPC ........... 318/445; 318/480; 318/466; 318/280; 318/468; 160/166.1; 160/236; 160/175; 160/178.3; 160/170; 250/206.1; 250/206.2
(58) Field of Classification Search
USPC ................. 318/468, 480, 16, 466, 280, 455; 160/176.1, 166.1, 174 R, 178.3, 170, 160/175, 177, 236, 197, 202, 166.1 P, 310, 160/160.1, 7, 1, 5; 250/206.2, 206.1
See application file for complete search history.

(56) References Cited

U.S. PATENT DOCUMENTS 3,809,143 A   5/1974  Ipekgil
4,914,360 A   4/1990  Hsieh et al.
(Continued)

FOREIGN PATENT DOCUMENTS

EP    0886030 A2    12/1998
EP    0972906 A1    1/2000
(Continued)

OTHER PUBLICATIONS

Lee, E.S. et al, Integrated Performance of an Automated Venetian Blind/Electric Lighting System in a Full-Scale Private Office, Proceedings of the ASHRAE/DOE/BTECC Conference, LBNL-41443, Sep. 1998, 26 pages, Lawrence Berkeley National Laboratory, Berkeley, California.

(Continued)

*Primary Examiner* — Rita Leykin
(74) *Attorney, Agent, or Firm* — Mark E. Rose; Philip N. Smith; Bridget L. McDonough

(57) ABSTRACT

A motorized venetian blind system for covering a window of a space comprising a blind drive unit having two motors to provide for independent control of a position of a bottom rail and a tilt angle of a plurality of slats of the blind system. The blind drive unit is operable to adjust the position of the bottom rail to a preset position, and to adjust the tilt angle of the slats to a preset angle in response to receiving a single digital message (e.g., a preset command). The blind drive unit is operable to automatically adjust the position of the bottom rail and the tilt angle of the slats to limit a direct sunlight penetration distance in the space to a maximum direct sunlight penetration distance, and to maximum a reflected sunlight penetration distance on a ceiling of the space, while minimizing occupant distractions.

16 Claims, 18 Drawing Sheets

(56) References Cited

U.S. PATENT DOCUMENTS

| | | | |
|---|---|---|---|
| 5,134,347 A * | 7/1992 | Koleda | 318/16 |
| 5,170,108 A * | 12/1992 | Peterson et al. | 318/469 |
| 5,237,169 A | 8/1993 | Grehant | |
| 5,275,219 A * | 1/1994 | Giacomel | 160/6 |
| 5,357,170 A | 10/1994 | Luchaco et al. | |
| 5,391,967 A | 2/1995 | Domel et al. | |
| 5,413,161 A | 5/1995 | Corazzini | |
| 5,467,266 A | 11/1995 | Jacobs et al. | |
| 5,603,371 A * | 2/1997 | Gregg | 160/176.1 P |
| 5,663,621 A * | 9/1997 | Popat | 318/480 |
| 5,760,558 A | 6/1998 | Popat | |
| 5,793,174 A | 8/1998 | Kovach et al. | |
| 5,848,054 A | 12/1998 | Mosebrook et al. | |
| 5,883,480 A | 3/1999 | Domel et al. | |
| 5,905,442 A | 5/1999 | Mosebrook et al. | |
| 5,990,646 A | 11/1999 | Kovach et al. | |
| 6,057,658 A | 5/2000 | Kovach et al. | |
| 6,064,949 A | 5/2000 | Werner et al. | |
| 6,084,231 A | 7/2000 | Popat | |
| 6,181,089 B1 | 1/2001 | Kovach et al. | |
| 6,259,218 B1 | 7/2001 | Kovach et al. | |
| 6,369,530 B2 * | 4/2002 | Kovach et al. | 318/16 |
| 6,405,105 B1 * | 6/2002 | Hsu et al. | 700/299 |
| 6,528,957 B1 | 3/2003 | Luchaco | |
| 6,755,230 B2 * | 6/2004 | Ulatowski et al. | 160/84.02 |
| 6,803,728 B2 | 10/2004 | Balasubramaniam et al. | |
| 6,812,662 B1 | 11/2004 | Walker | |
| 6,927,547 B2 | 8/2005 | Walko, Jr. et al. | |
| 6,983,783 B2 | 1/2006 | Carmen, Jr. et al. | |
| 7,019,276 B2 | 3/2006 | Cloutier et al. | |
| 7,085,627 B2 | 8/2006 | Bamberger et al. | |
| 7,111,952 B2 | 9/2006 | Veskovic | |
| 7,310,559 B2 | 12/2007 | Walko, Jr. | |
| 7,315,146 B2 | 1/2008 | Bejean | |
| 7,389,806 B2 * | 6/2008 | Kates | 160/5 |
| 7,401,634 B2 | 7/2008 | Kovach et al. | |
| 7,417,397 B2 | 8/2008 | Berman et al. | |
| 7,418,313 B2 * | 8/2008 | Devis et al. | 700/286 |
| 7,466,090 B2 | 12/2008 | Meewis et al. | |
| 7,566,137 B2 | 7/2009 | Veskovic | |
| 7,588,067 B2 | 9/2009 | Veskovic | |
| 7,673,667 B2 | 3/2010 | Domel et al. | |
| 7,719,215 B2 | 5/2010 | Meewis et al. | |
| 7,737,653 B2 | 6/2010 | Carmen, Jr. et al. | |
| 7,839,109 B2 | 11/2010 | Carmen, Jr. et al. | |
| 7,941,245 B1 * | 5/2011 | Popat | 700/275 |
| 7,950,827 B2 | 5/2011 | Veskovic | |
| 7,963,675 B2 | 6/2011 | Veskovic | |
| 7,977,904 B2 | 7/2011 | Berman et al. | |
| 8,091,604 B2 * | 1/2012 | Kluck | 160/1 |
| 8,106,768 B2 * | 1/2012 | Neumann | 340/539.26 |
| 8,193,742 B2 * | 6/2012 | Skinner et al. | 318/34 |
| 2005/0110416 A1 | 5/2005 | Veskovic | |
| 2006/0207730 A1 | 9/2006 | Berman et al. | |
| 2007/0211446 A1 | 9/2007 | Veskovic | |
| 2007/0211447 A1 | 9/2007 | Veskovic | |
| 2008/0092075 A1 | 4/2008 | Jacob et al. | |
| 2008/0236763 A1 | 10/2008 | Kates | |
| 2008/0262637 A1 | 10/2008 | Dorrough | |
| 2008/0283621 A1 | 11/2008 | Quirno et al. | |
| 2009/0020233 A1 | 1/2009 | Berman et al. | |
| 2009/0065598 A1 | 3/2009 | Quirno et al. | |
| 2009/0222137 A1 * | 9/2009 | Berman et al. | 700/275 |
| 2009/0240381 A1 | 9/2009 | Lane | |
| 2009/0254222 A1 | 10/2009 | Berman et al. | |
| 2009/0256021 A1 | 10/2009 | Dorrough | |
| 2010/0071856 A1 | 3/2010 | Zaharchuk et al. | |
| 2011/0029136 A1 | 2/2011 | Altonen et al. | |
| 2011/0031806 A1 * | 2/2011 | Altonen et al. | 307/32 |
| 2011/0035061 A1 | 2/2011 | Altonen et al. | |
| 2011/0240232 A1 | 10/2011 | Kluck | |
| 2011/0251720 A1 | 10/2011 | Neuman | |
| 2012/0073765 A1 | 3/2012 | Hontz et al. | |

FOREIGN PATENT DOCUMENTS

| | | |
|---|---|---|
| EP | 1496190 A1 | 1/2005 |
| WO | WO 2007/030322 | 3/2007 |

OTHER PUBLICATIONS

Lee, E.S. et al, Low-Cost Networking for Dynamic Window Systems, Energy and Buildings 36, LBNL-52198, 2004, 13 pages, Lawrence Berkeley National Laboratory, Berkeley, California.

Elegazzo, Grand Elegance Power Blinds Product Literature, 2008, 8 pages.

* cited by examiner

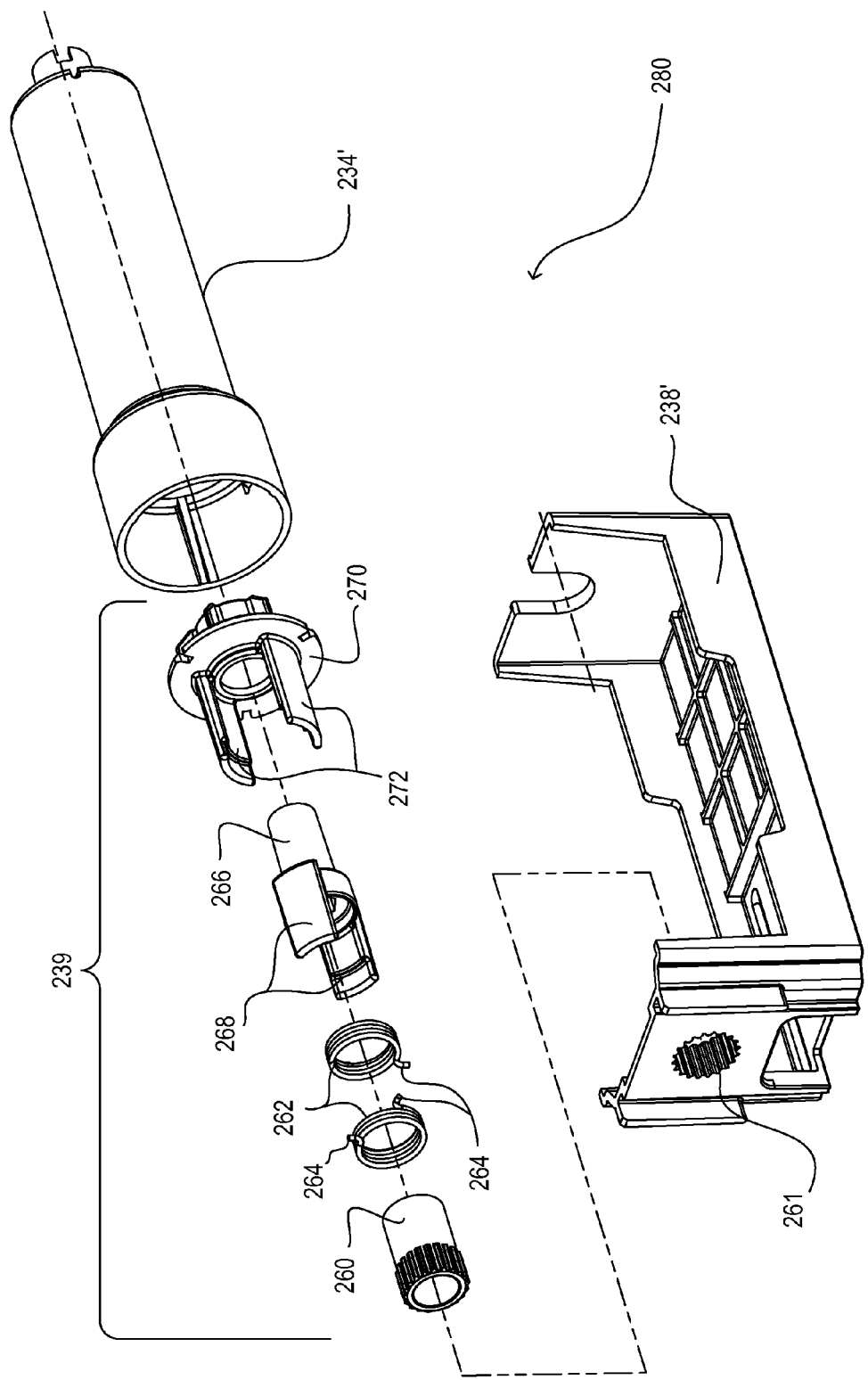

MOTORIZED VENETIAN BLIND SYSTEM

CROSS-REFERENCE TO RELATED APPLICATIONS

This application is a non-provisional application of commonly-assigned U.S. Provisional Application No. 61/384,005, filed Sep. 17, 2010, entitled MOTORIZED VENETIAN BLIND SYSTEM, the entire disclosure of which is hereby incorporated by reference.

BACKGROUND OF THE INVENTION

1. Field of the Invention

The present invention relates to a window treatments, and more particularly, to a motorized venetian blind system.

2. Description of the Related Art

Window treatments, such as, for example, roller shades, draperies, roman shades, and venetian blinds, are normally mounted in front of windows to provide for control of the amount of sunlight entering a space. A typical venetian blind system comprises a number of elongated slats extending along the width of the window and spaced apart vertically between a head rail and a bottom rail. The blind system typically comprises a lift cord that extends from the bottom rail through openings in the slats to the head rail and provides for lifting the bottom rail to raise and lower the slats. In a manual blind system, the end of the lift cord that is not attached to the bottom rail often hangs down from the head rail, such that a user may pull on the lift cord to raise and lower the slats. The blind system also typically comprises a tilt ladder that extends between the head rail and the bottom rail and operates to support and tilt the slats. Typical prior art manual blind systems include a rod that hangs from the head rail and may be rotated to adjust the tilt angle of the slats. The slats may be oriented substantially horizontal (i.e., perpendicular to the window) to allow sunlight to enter the space, and may be oriented substantially vertical (i.e., parallel to the window) to prevent sunlight from entering the space.

Some prior art venetian blind systems have included a motor to provide for lifting and tilting the slats. Such motorized venetian blind systems typically comprise a single motor coupled to a drive shaft that extends across the width of the head rail. The drive shaft may have at least two drums for winding up the lift cords when the shaft is rotated by the motor. The tilt ladders are typically coupled to the drive shaft through frictional force, such that when the slats have been fully tilted in one direction, the ends of the tilt ladder slip by the drive shaft as the drive shaft is rotated. To adjust the tilt of the slats, the drive shaft may be rotated in the reverse direction, such that the frictional force between the tilt ladder and the drive shaft causes the ends of the tilt ladder to rotate. Accordingly, the motor must be rotated in the reverse direction to adjust the tilt of the slats in typical prior art motorized venetian blind systems that comprise a single motor. This can be disadvantageous when, for example, the bottom rail is lowered to a fully-lowered position. In order to adjust the tilt of the slats in this condition, the bottom rail must be raised from the fully-lowered position, thus allowing sunlight to enter the space.

Thus, there exists a need for a motorized venetian blind system that has more accurate and flexible control of the position of the bottom rail and the tilt angle of the slats.

SUMMARY OF THE INVENTION

According to an embodiment of the present invention, a motorized venetian blind system is adapted to automatically control the amount of sunlight entering a space of a building through a window located in a façade of the building by adjusting position of a bottom rail and a tilt angle of rectangular slats that extend across the width of the window to control a direct sunlight penetration distance within the space while minimizing occupant distractions and a reflected sunlight penetration distance on a ceiling of the space. The method comprises the following steps: (1) receiving a desired maximum direct sunlight penetration distance and a desired maximum reflected sunlight penetration distance for the space; (2) building a timeclock schedule having a start time and an end time, the timeclock schedule including a number of timeclock events that will occur between the start time and the end time; (3) receiving a minimum time period that may occur between any two consecutive timeclock events; (4) determining, for each of the timeclock events, an event time between the start time and the end time, such that at least the minimum time period exists between the event times of any two consecutive timeclock events; (5) determining, for each of the timeclock events, a respective bottom rail position to which the bottom rail of the motorized venetian blind system will be controlled at the respective event time, and a respective tilt angle to which the slats of the motorized venetian blind system will be tilted at the respective event time, such that the direct sunlight penetration distance will not exceed the desired maximum direct sunlight penetration distance and the reflected sunlight penetration distance on the ceiling of the space will not exceed the desired maximum reflected penetration distance for all of the events between the start time and the end time of the timeclock schedule; and (6) automatically controlling the motorized venetian blind system according to the timeclock schedule by adjusting the position of bottom rail of the motorized venetian blind system to the respective position of each of the timeclock events at the respective event time, and the tilt angle of the slats of the motorized venetian blind system to the respective tilt angle of each of the timeclock events at the respective event time.

According to another aspect of the present invention, a load control system controls the amount of sunlight entering a space of a building through a window located in a façade of the building to control a direct sunlight penetration distance within the space and a reflected sunlight penetration distance on a ceiling of the space. The load control system includes: (1) a motorized venetian blind system having a bottom rail and a plurality of rectangular slats that extend across the width of the window; and (2) a central controller operatively coupled to the motorized venetian blind system. The central controller is operable to transmit digital commands to the motorized venetian blind system, and receive a desired direct maximum sunlight penetration distance, a desired maximum reflected sunlight penetration distance, and a minimum time period that may occur between any two consecutive movements of the motorized venetian blind system. The central controller is operable to calculate a controlled bottom rail position to which the bottom rail of the motorized venetian blind system should be controlled and a controlled tilt angle to which the slats of the motorized blind venetian system should be tilted during each of a plurality of consecutive time intervals, such that the sunlight penetration distance does not exceed the desired maximum direct sunlight penetration distance and the reflected sunlight penetration distance on the ceiling of the space will not exceed the desired maximum reflected penetration distance during each of the respective time intervals. The time intervals have lengths greater than or equal to the minimum time period that may occur between any two consecutive movements of the motorized venetian blind system. The central controller is operable to automatically adjust the position of the bottom rail to the controlled bottom rail position and the tilt angle of the slats to the controlled tilt angle at the beginning of each time interval, such that the sunlight penetration distance will not exceed the desired maximum direct sunlight penetration distance and the reflected sunlight penetration distance does not exceed the desired maximum reflected sunlight penetration distance during each of the respective time intervals, and the movements of the motorized venetian blind system are spaced apart by at least the minimum time period that may occur between any two consecutive movements of the motorized venetian blind system.

Other features and advantages of the present invention will become apparent from the following description of the invention that refers to the accompanying drawings.

BRIEF DESCRIPTION OF THE DRAWINGS

The invention will now be described in greater detail in the following detailed description with reference to the drawings in which:

FIG. 10 is an exploded perspective view of a lift cord spool assembly according to an alternative embodiment;

DETAILED DESCRIPTION OF THE INVENTION

Figure 1:
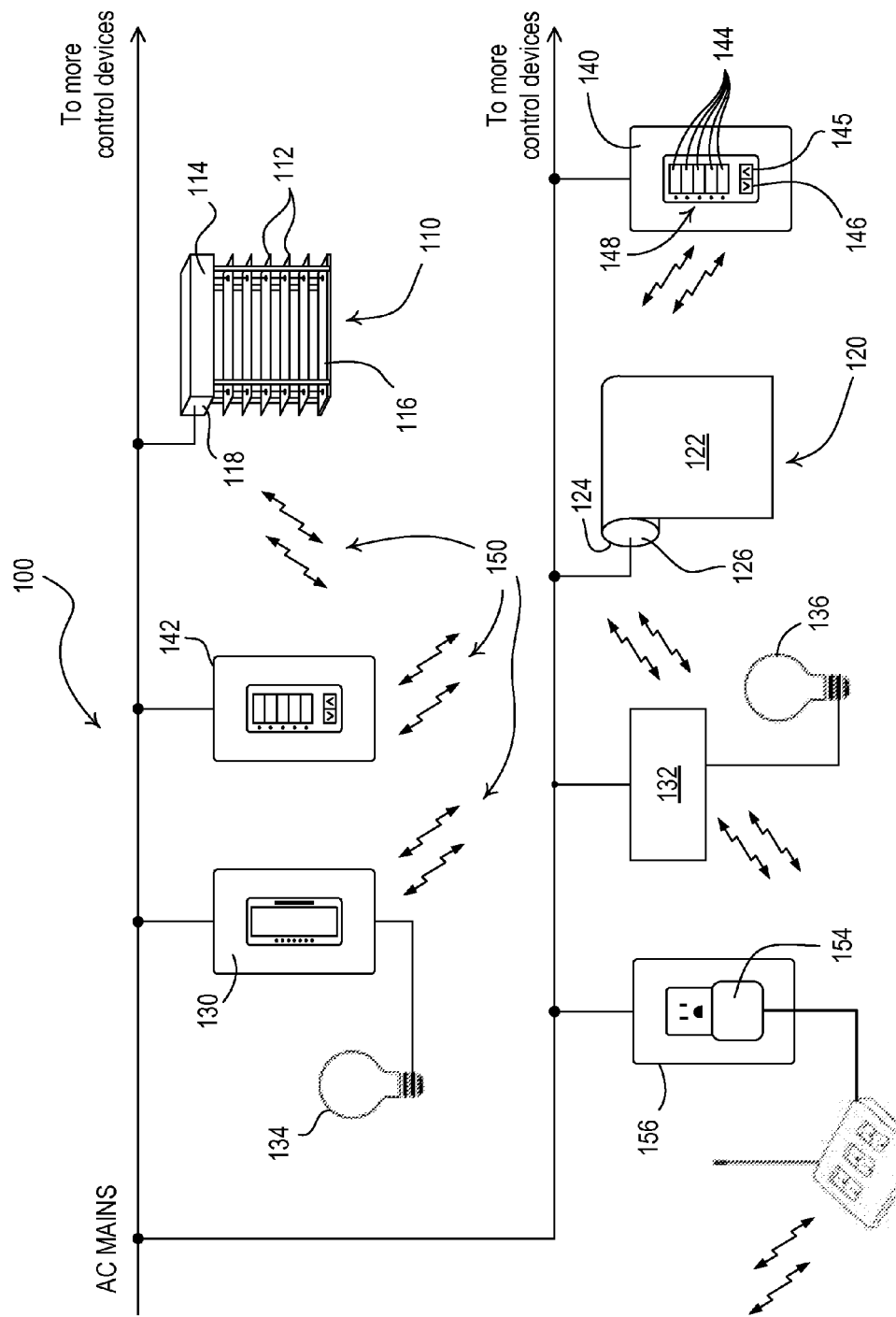
FIG. 1 is a simplified block diagram of a wireless load control system having a motorized venetian blind system according to a first embodiment of the present invention.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

FIG. 1 is a simplified block diagram of a wireless load control system 100 having a motorized venetian blind system 110 according to a first embodiment of the present invention. The blind system 110 comprises a plurality of flat slats 112 displaced between a head rail 114 and a bottom rail 116, and may be mounted in front of a window. The blind system 110 also comprises a blind drive unit 118 located in the head rail 114 for raising and lowering the bottom rail 116, and tilting the slats 112 to control the amount of daylight entering a space as will be described in greater detail below. According to the present invention, the blind drive unit 118 is operable to independently control a position $P_{BLIND}$ of the bottom rail 116 and a tilt angle $\theta_{BLIND}$ of the slats 112, so as to control the amount of daylight entering the space in which the blind system 110 is installed. The blind drive unit 118 is operable to receive power from a source of AC power (e.g., an AC mains voltage, such as 120 VAC @ 60 Hz). Alternatively, the blind drive unit 112 of the blind system 110 may receive a low-voltage AC voltage (e.g., approximately 24 VAC) from a transformer, or a direct-current (DC) supply voltage (e.g., approximately 30 VDC) from a DC power supply.

The load control system 100 may additionally comprise other types of motorized window treatments, such as, for example, a motorized roller shade 120 having a shade fabric 122 windingly received around a roller tube 124 for adjusting the amount of daylight entering the space. The motorized roller shade 120 may comprise a shade drive unit 126 located inside the roller tube 124 for rotating the roller tube to adjust the position of the shade fabric 122.

In addition, the load control system 100 may comprise lighting control devices (e.g., a wall-mounted dimmer 130 and a remote dimming module 132) and remote control devices (e.g., wall-mounted master keypads 140, 142). The dimmer 130 and the remote dimming module 132 are operable to control the amount of power delivered from the AC power source to respective lighting loads 134, 136, and thus adjust the intensity of the lighting loads. The keypads 140, 142 each comprise a plurality of preset buttons 144, which may be programmed, for example, to recall predetermined presets or scenes. Each preset may include preset lighting intensities for the lighting loads 134, 136, and preset fabric positions for the roller shade 120. According to an aspect of the present invention, the presets may also include positions of the bottom rail 116 and corresponding tilt orientation of the slats 112 of the blind system 110. The keypads 130, 132 may also comprise a raise button 145 and a lower button 146 which may be programmed to respectively raise and lower the position $P_{BLIND}$ of the bottom rail 116 of the blind system 110, the tilt angle $\theta_{BLIND}$ of the slats 112 of the blind system 110, the position of the shade fabric 122 of the roller shade 120, and/or the intensities of one or more of the lighting loads 134, 136. The keypads may also comprise a plurality of visual indicators 148 (e.g., LEDs) for display feedback of, for example, which preset is selected.

The load control system 100 utilizes a wireless RF communication link for communication of digital messages between the control devices of the system via wireless RF signals 150 according to a predetermined communication protocol. Each of the control devices is assigned an address (i.e., a unique identifier) during configuration of the load control system 100 to allow each of the control devices to transmit the digital message to a specific control device. In response to an actuation of one of the buttons 144, 145, 146 the keypads 140, 142 transmit "command" digital messages via the RF signals 150 to the blind drive unit 118, the shade drive unit 126, the dimmer 130, and the remote dimming module 132 to control the associated loads. The load control system 100 may also comprises a signal repeater 152 which operates to retransmit any received digital messages to ensure that all of the control devices of the load control system receive all of the RF signals 150. The signal repeater 152 is coupled to the AC mains voltage via a power supply 154 plugged into an electrical outlet 156. An example of a communication protocol for a wireless load control system is described in greater detail is commonly-assigned U.S. patent application Ser. No. 12/033,223, filed Feb. 19, 2008, entitled COMMUNICATION PROTOCOL FOR A RADIO-FREQUENCY LOAD CONTROL SYSTEM, the entire disclosure of which is hereby incorporated by reference.

Figure 2:
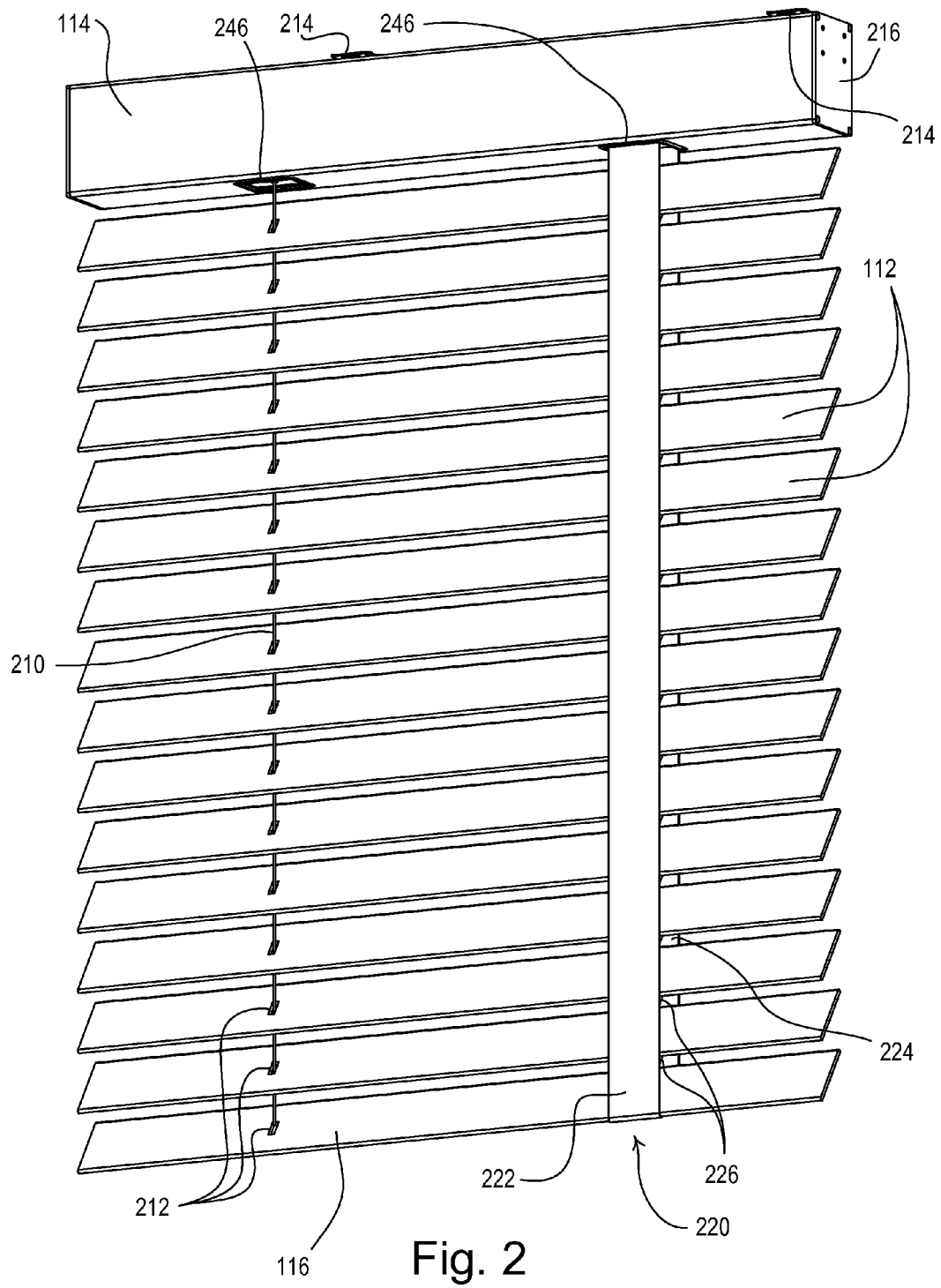
FIG. 2 is a perspective view of the motorized venetian blind system of FIG. 1.
Figure 3:
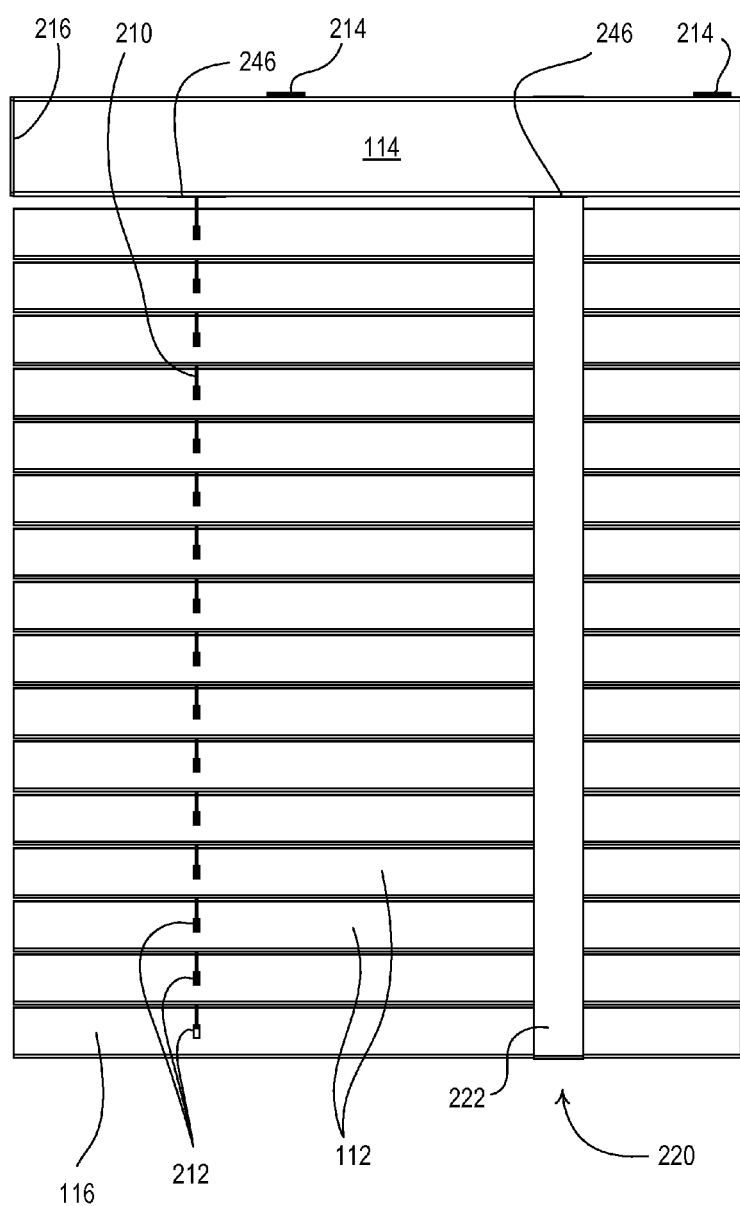
FIG. 3 is a front view of the motorized venetian blind system of FIG. 1.
Figure 4:
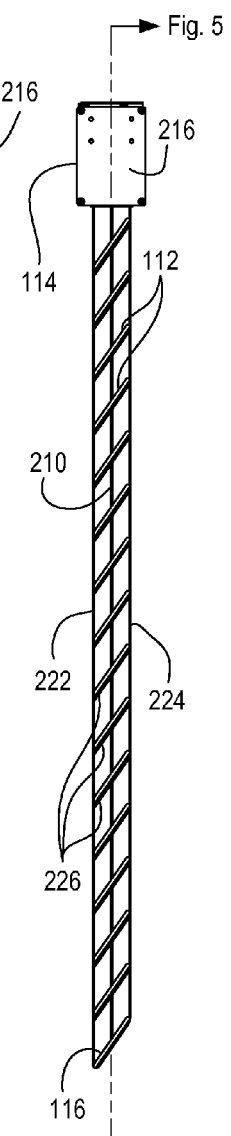
FIG. 4 is a right side view of the motorized venetian blind system of FIG. 1.

FIG. 2 is a perspective view, FIG. 3 is a front view, and FIG. 4 is a right side view of the motorized venetian blind system 110 of the load control system 100. The blind system 110 comprises two lift cords 210 positioned at the left and right ends (i.e., opposite ends) of the slats 112 to provide for lifting the bottom rail 116. The blind system 110 further comprises two tilt ladders 220 positioned at the left and right ends of the slats 112 to provide for tilting the slats 112. The tilt ladders 220 are typically positioned in front of the lift cords 210. The left tilt ladder 220 is not shown in FIGS. 2 and 3 so that the left lift cord 210 may be viewed. The flat slats 112 extend across the width of the window that the blind system 110 is covering and are spaced apart equally between the head rail 114 and the bottom rail 116. Alternatively, the slats 112 could comprise curved slats rather than flat slats. The lift cords 210 each extend from the blind drive unit 118 in the head rail 114 to the bottom rail 116 through lift cord openings 212 in each of the slats 112. The blind drive unit 118 is operable to wind and unwind the lift cords 210 to respectively raise and lower the bottom rail 116 between a fully-raised position $P_{FR}$ and a fully-lowered position $P_{FL}$. As the blind drive unit 118 raises the bottom rail 116, the slats 112 each contact the bottom rail one-by-one and are raised up with the bottom rail. In addition, the blind drive unit 118 may control the bottom rail 116 to a specific intermediate position between the fully-raised position $P_{FR}$ and the fully-lowered position $P_{FL}$. The blind system 110 further comprises mounting brackets 214 coupled to the top of the head rail 114 for mounting the blind drive system to a ceiling above the window, and side panels 216 that allow for alternatively mounting the blind drive system to walls surrounding the window.

The tilt ladders 220 each have a front band 222 (i.e., a front ribbon) and a rear band 224 (i.e., a rear ribbon) that extend parallel to each other from the head rail 114 to the bottom rail 116 adjacent to the lift cords 210. Each tilt ladder 220 also comprises a plurality of rungs 226 (i.e., bands or ribbons) that extend from the front band 222 to the rear band 224 between each pair of adjacent slats 112 of the blind system 110 to thus form a ladder (as shown in FIG. 4). Accordingly, each of the slats 112 rests on one of the rungs 226 in each of the tilt ladders 220, such that the slats are equally space apart vertically when the bottom rail 116 is in the fully-lowered position $P_{FL}$. The front and rear bands 222, 224 are coupled to the blind drive unit 118 in the head rail 114. As the blind drive unit 118 winds up the lift cord 210 to raise the bottom rail 116, the portions of the tilt ladders 220 between adjacent rungs 226 become slack as the raising bottom rail and accumulating slats 112 meet the next slat.

The blind drive unit 118 is operable to tilt the slats 112 by vertically moving the front and rear bands 222, 224 with respect to each other, such that the rungs 226, and thus the slats 112, are tilted at an angle with respect to the front and rear bands (i.e., the tilt angle $\theta_{BLIND}$). The blind drive unit 118 is operable to control the slats 112 to each be in a horizontal orientation (i.e., the tilt angle $\theta_{BLIND}$ equals approximately zero degrees) to allow daylight to enter the space in which the blind system 110 is installed when the bottom rail 116 is at the fully-lowered position $P_{FL}$ or any intermediate positions between the fully-raised position $P_{FR}$ and a fully-lowered position $P_{FL}$. The blind drive unit 118 is operable to tilt the slats approximately 90 degrees in each direction from the horizontal orientation, i.e., towards the front and towards the rear of the blind system 110, to control the slats to a fully front-tilted position or to a fully rear-tilted position, respectively, to thus limit the amount of daylight entering the space. Alternatively, the front and rear bands 222, 224 and the rungs 226 of the tilt ladders 220 could comprise cords. In addition, the motorized venetian blind system 110 could comprise additional lift cords 210 and tilt ladders 220 to accommodate longer slats 112 and bottom rails 116.

Figure 5:
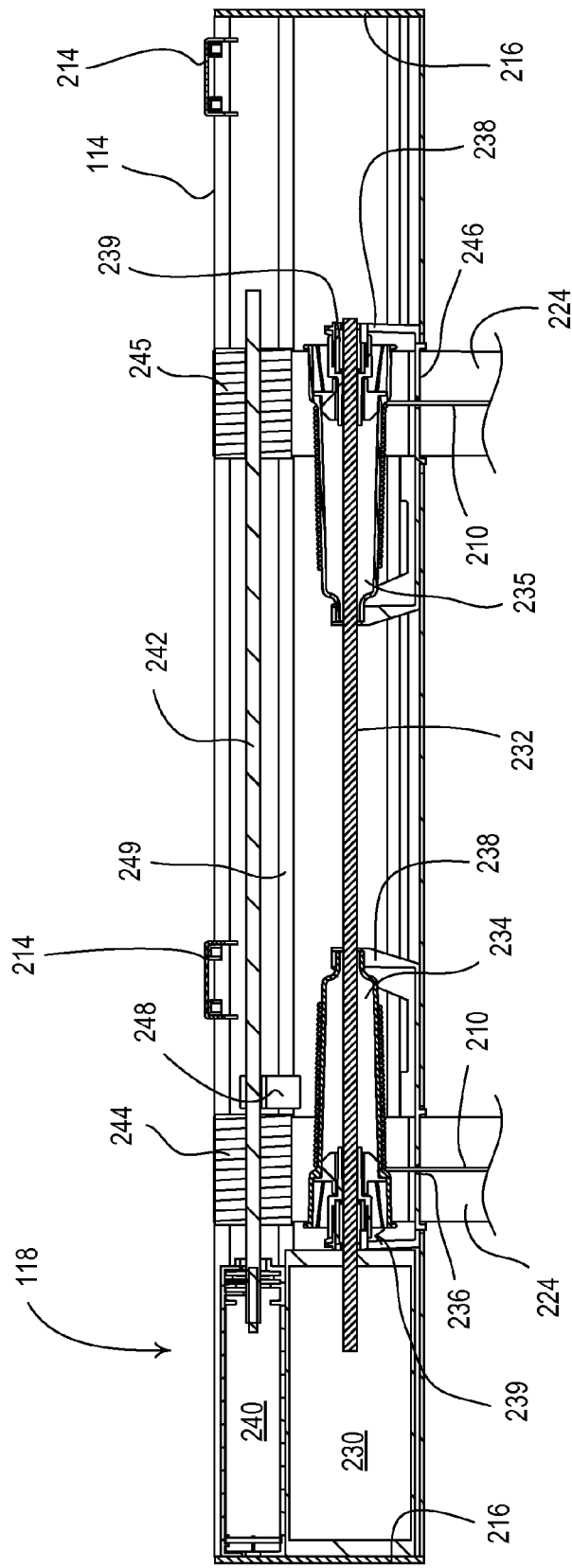
FIG. 5 is a front cross-sectional view of a head rail and a blind drive unit of the motorized venetian blind system of FIG. 1.
Figure 6:
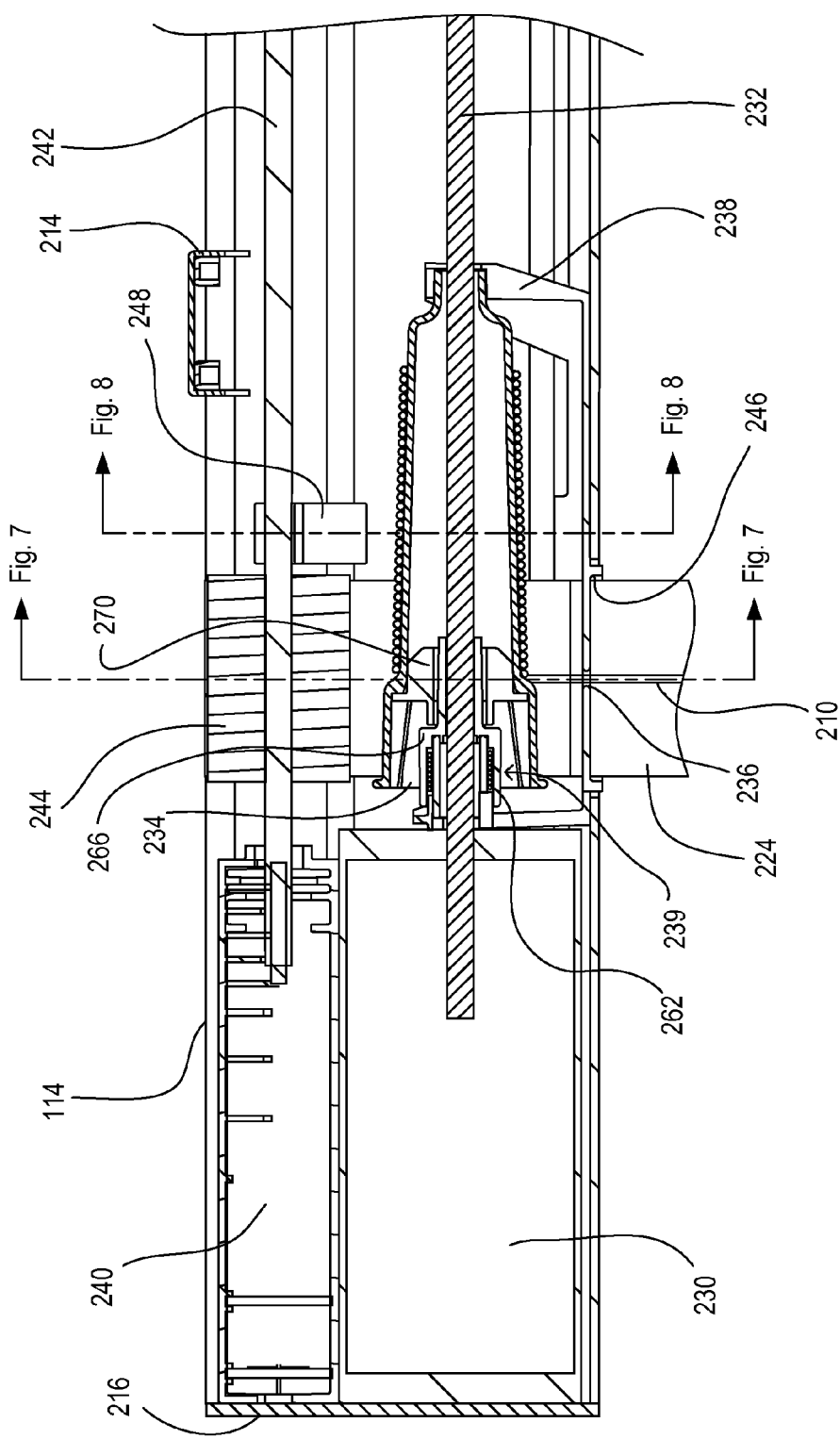
FIG. 6 is an enlarged partial front cross-sectional view of the left side of head rail and a blind drive unit of FIG. 5.

FIG. 5 is a front cross-sectional view of the head rail 114 taken through the center of the head rail as shown in FIG. 4 in order to show the blind drive unit 118 in greater detail. The blind drive unit 118 comprises two motors: a lift cord motor 230 and a tilt ladder motor 240. The lift cord motor 230 is operable to rotate a lift cord drive shaft 232, which is coupled to a first lift cord spool 234 located at the left side of the head rail 114 (as shown in FIG. 5) and a second lift cord spool 235 located at the right side of the head rail. The lift cords 210 enter the head rail 114 through respective lift cord openings 236 and are windingly received around the first and second lift cord spools 234, 235. Each of the first and second lift cord spools 234, 235 are rotatably coupled to a respective lift cord spool carrier 238, such that each lift cord spool is operable to rotate to wind the respective lift cord 210 around the spool. In addition, the blind drive unit 118 comprises spring-wrap brakes 239 located in each of the first and second lift cord spools 234, 235. The spring-wrap brakes 239 are coupled between the lift cord drive shaft 232 and the respective lift cord spools 234, 235 via respective output coupler structures 270 and input coupler structures 266 (FIG. 6). The spring-wrap brakes 239 further include respective brake coil springs 262 (FIG. 6) which will be described in greater detail below.

The tilt ladder motor 240 is operable to rotate a tilt ladder drive shaft 242, which is coupled to a first tilt ladder drum 244 located at the left side of the head rail 114 and a second tilt ladder drum 245 located at the right side of the head rail. The front and rear tilt ladder bands 222, 224 enter the head rail 114 through respective tilt ladder band openings 246 and are fixedly connected to the respective tilt ladder drum 244, 245. The tilt ladder drive shaft 242 is supported by a tilt ladder drive shaft support 248, which is connected to extensions 249 formed in the head rail 114.

Figure 7:
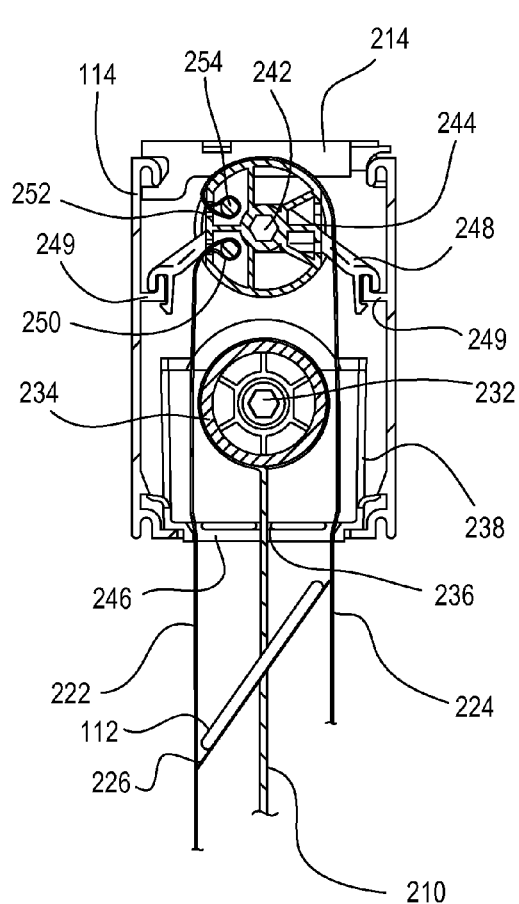
FIG. 7 is a left side cross-sectional view of the blind drive unit of FIG. 5 taken through a first lift cord spool and a first tilt ladder drum of the blind drive unit.
Figure 8:
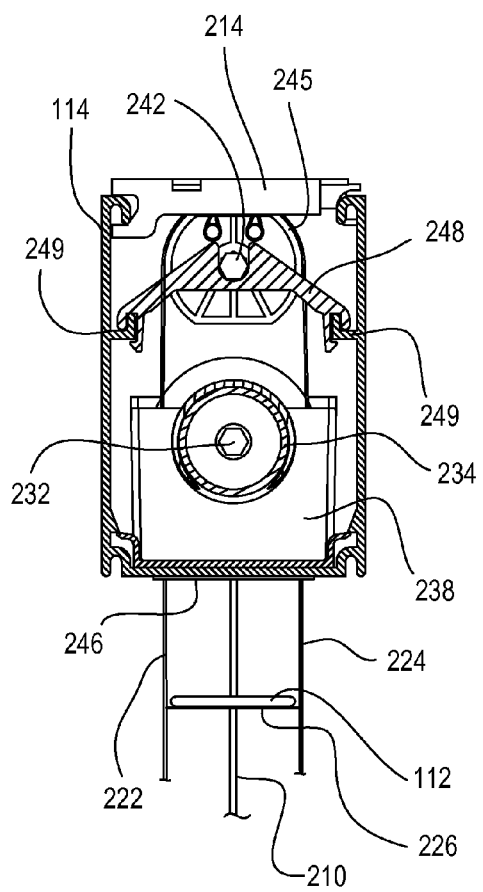
FIG. 8 is a left side cross-sectional view of the blind drive unit of FIG. 5 taken through a tilt ladder drive shaft support of the blind drive unit.
Figure 9A:
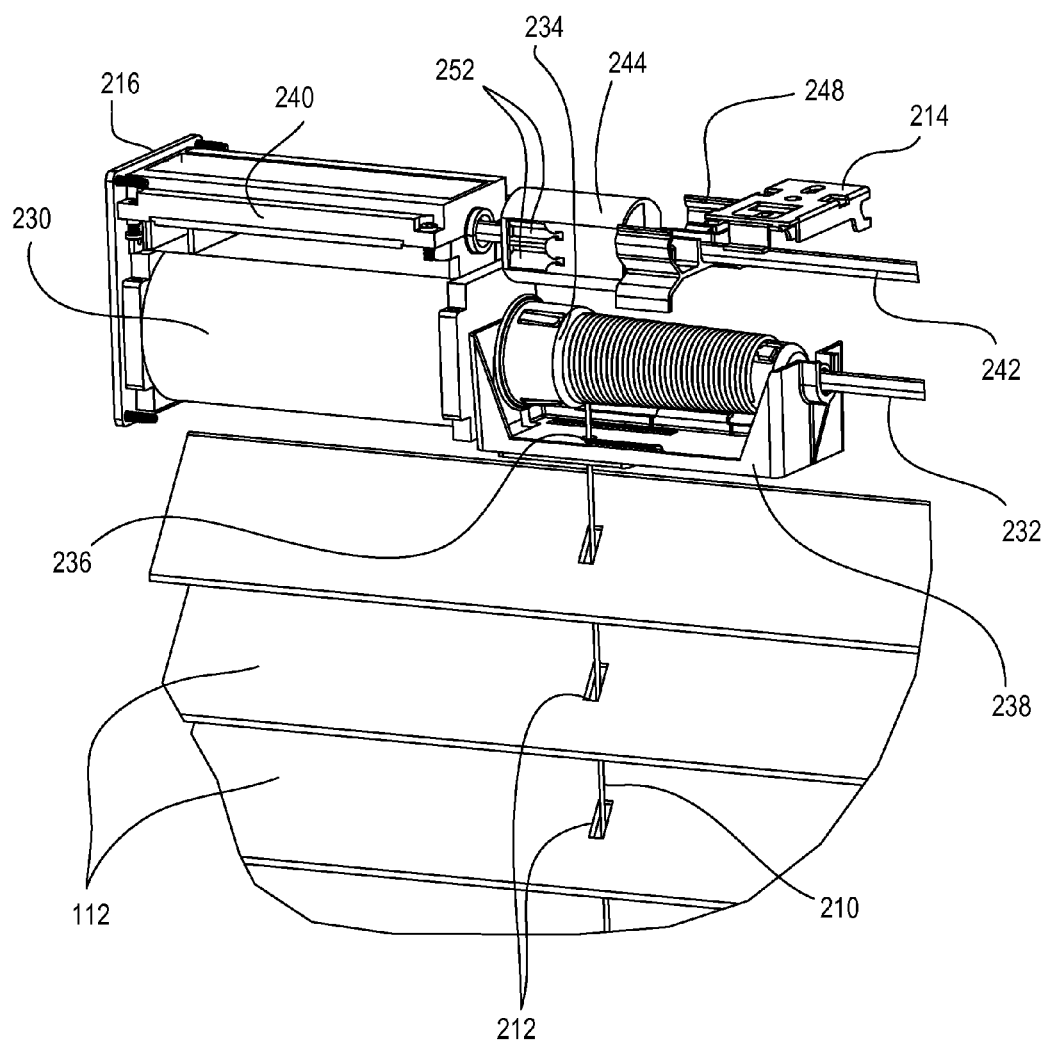
FIG. 9A is a partial perspective view of the left section of the blind drive unit of FIG. 5 without the head rail shown.
Figure 9B:
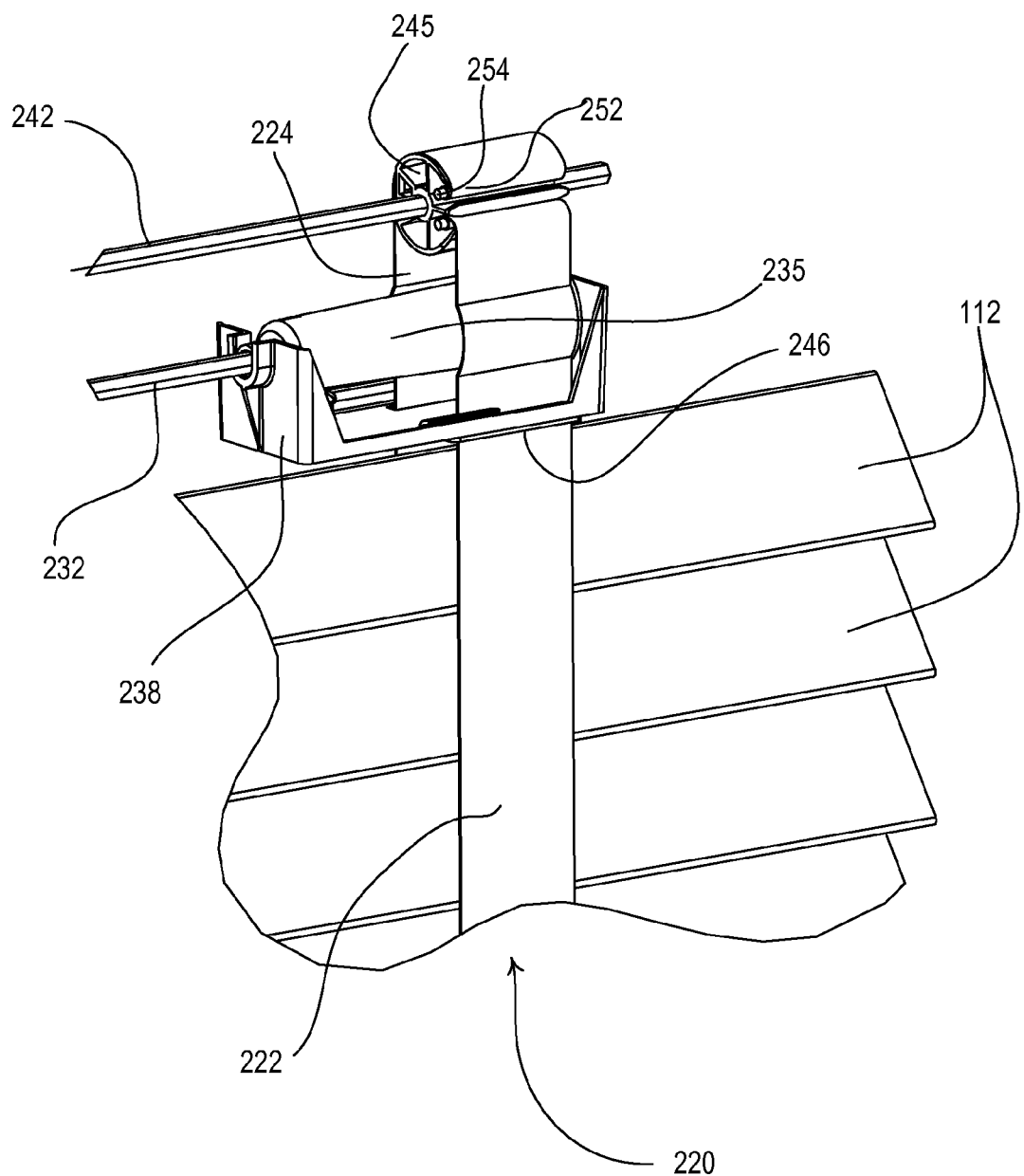
FIG. 9B is a partial perspective view of the right section of the blind drive unit of FIG. 5 without the head rail shown.

FIG. 6 is an enlarged partial front cross-sectional view of the left side of head rail 114 showing the first lift cord spool 234 and the first tilt ladder drum 244 of the blind drive unit 118 in greater detail. FIG. 7 is a left side cross-sectional view of the blind drive unit 118 taken through the first lift cord spool 234 and the first tilt ladder drum 244 as shown in FIG. 6. FIG. 8 is a left side cross-sectional view of the blind drive unit 118 taken through the tilt ladder drive shaft support 248 as shown in FIG. 6. FIG. 9A is a partial perspective view of the left section of the blind drive unit 118 without the head rail 114 and the tilt ladder 220 shown. FIG. 9B is a partial perspective view of the right section of the blind drive unit 118 without the head rail 114 (or cord 210) shown.

When lift cord motor 230 rotates in a first angular direction towards the front of the blind system 110, the lift cords 210 wrap around the first and second lift cord spools 234, 235, thus pulling the bottom rail 116 up towards the head rail 114. Each lift cord spools 234, 235 are slightly sloped such that the radius of the lift cord spool decreases towards the center of the head rail 114. Accordingly, as each lift cord 210 wraps around the respective lift cord spool 234, 235, the new portion of the lift cord that meets the spool pushes the wrapped portion of the lift cord towards the center of the head rail 114 as shown in FIG. 9. When lift cord motor 230 rotates in a second angular direction towards the rear of the blind system 110, the lift cords 210 unwrap, thus allowing the bottom rail 116 to move down.

The tilt ladder motor 240 includes a gear assembly for reducing the angular velocity of the tilt ladder drive shaft 242 (as compared to the angular velocity of the motor), such that the tilt ladder drive shaft only rotates a total of 180 degrees. The ends of the first and second bands 222, 224 of the tilt ladder 220 may comprise, for example, folded hems 250 that are adapted to be received in openings 252 in the tilt ladder drums 244, 245 and slide over pins 254 inside the drums to firmly connect the bands to the drums (as shown in FIG. 7). When the tilt ladder drums 244, 245 are in an initial position (as shown in FIG. 8), the rungs 226 of the tilt ladders 220, and thus the slats 112, are oriented horizontally, such that sunlight may enter the space in which the blind system 110 is installed. The tilt ladder motor 240 is operable to rotate the first and second tilt ladder drums 244, 245 in each direction from the initial position to tilt the slats 112 towards the fully front-tilted position (as shown in FIG. 4) or towards the fully rear-tilted position. The tilt ladder motor 240 may rotate the first and second tilt ladder drums 244, 245 by approximately 90 degrees in the first angular direction towards the front of the blind system 110 in order to tilt the slats 112 to the fully front-tilted position. The tilt ladder motor 240 may rotate the first and second tilt ladder drums 244, 245 by approximately 90 degrees from the initial position in the second angular direction towards the rear of the blind system 110 (as shown in FIG. 7) in order to tilt the slats 112 to the fully rear-tilted position. The tilt ladder motor 240 is operable to rotate the tilt ladder drive shaft 242 with enough precision to control the tilt angle $\theta_{BLIND}$ of the slats 112 to, for example, approximately 70 different angles.

Because the blind drive unit 118 comprises two motors, the blind drive unit is able to more accurately control the position $P_{BLIND}$ of the bottom rail 116 and the tilt angle $\theta_{BLIND}$ of the slats 112 near the fully-raised position $P_{FR}$ and the fully-lowered position $P_{FL}$. For example, when the bottom rail 116 is at the fully-lowered position $P_{FL}$, the blind drive unit 118 may adjust the tilt angle $\theta_{BLIND}$ of the slats 112 without raising the bottom rail (as was required in the prior art motorized venetian blind systems). In other words, the blind drive system 100 of the present invention is able to adjust the slats to either the fully front-tilted or the fully rear-tilted position when the bottom rail 116 is at the fully-lowered position $P_{FL}$, for example, to prevent daylight from entering the space.

FIG. 10 is an exploded perspective view of a lift cord spool assembly 280 according to an alternative embodiment of the blind drive unit 118. The lift cord spool assembly 280 comprises the spring-wrap brake 239 and illustrates the elements of the brake in greater detail. The lift cord spool assembly 280 further comprises a lift cord spool carrier 238' and a lift cord spool 234' that are functionally similar to the lift cord spool carrier 238 and lift cord spool 234 described above. The spring-wrap brake 239 comprises a mandrel 260 that is fixedly received in a keyed opening 261 of the lift cord spool 234'. The mandrel 260 includes an opening to receive the drive shaft 232 of the lift cord motor 230. The spring-wrap brake 239 comprises two coil springs 262 that fit snugly around the outer surface of the mandrel 260. Each spring 262 comprises a pair of tangs 264 that protrude outwardly from each spring. The spring-wrap brake 239 further comprises an outer coupler structure 270 and an inner coupler structure 266. The outer coupler structure 270 comprises a pair of outer coupler legs 272 and is fixedly attached to the lift cord spool 234'. The inner coupler structure 266 comprises a pair of inner coupler legs 268 and fits partially within the outer coupler structure 270 such that the inner coupler legs 268 are operable to fit between the outer coupler legs 272.

The tangs 264 of the coil springs 262 are spaced apart such that they may receive the pair of inner coupler legs 268 of the inner coupler structure 266 which is fixedly attached to the drive shaft 232. When the mandrel 260, the coil springs 262, the inner coupler structure 268, and the outer coupler structure 270 are assembled together, each tang 264 of the coil springs 262 reside adjacent to both one of the inner coupler legs 268 and one of the outer coupler legs 272. The drive shaft 232 of the lift cord motor 230 is received through the elements of the lift cord spool assembly 280 (as shown by the dashed line of FIG. 10), and is fixedly coupled to the inner coupler structure 266. In addition, the spring-wrap brake 239 may be contained within the lift cord spool 234' either fully or partially.

When the lift cord motor 230 rotates the drive shaft 232 in either angular direction, the inner coupler legs 268 contact the tangs 264 of the coil springs 262 to open (loosen) the springs around the mandrel 260 by pushing the tangs 264 of each spring apart, such that the springs, now loosened, may allow for rotation of the lift cord spool 234'. In the event that the bottom rail of the blind drive unit 118 is pulled manually, the outer legs 272 of the outer coupler structure 270 are operable to push the tangs 264 of each spring 262 together, thus tightening the springs. The tightened coil springs 262 thus act as a brake to prevent the lift cord motor 230 from being back-driven in the event that the bottom rail 116 is pulled manually.

Thus, as illustrated by the exemplary lift cord assembly 280 of FIG. 10, the spring-wrap brakes 239 operate to allow the lift cord motor 230 to rotate the first and second lift cord spools 234' (or 234), 235 to raise and lower the bottom rail 116, but prevent forces on the lift cords 210 from rotating the lift cord drive shaft 232. Therefore, the lift cord motor 230 does not include its own brake (e.g., coupled between the motor shaft and the drive shaft) and thus can be sized smaller, so as to fit in the space between the first lift cord spool 234 and the adjacent side panel 216. If multiple lift cords 210 are provided to accommodate longer slats 112, additional spring-wrap brakes 239 may be provided (in additional lift cord spools for the additional lift cords) to thus handle the additional weight of the longer slats. Thus, the spring-wrap brakes 239 provide a scalable solution for blind drive systems 110 of widely varying sizes. In addition, because spring-wrap brakes 239 are separate from the lift cord motor 230, the spring-wrap brakes are operable to keep the bottom rail 116 in place in the event that the lift cord motor requires any type of servicing or replacement. Another example of a spring-wrap brake is described in greater detail in commonly-assigned U.S. patent application Ser. No. 12/769,069, filed Apr. 28, 2010, entitled MANUAL ROLLER SHADE HAVING CLUTCH MECHANISM, CHAIN GUIDE AND UNIVERSAL MOUNTING, the entire disclosure of which is hereby incorporated by reference.

Figure 11:
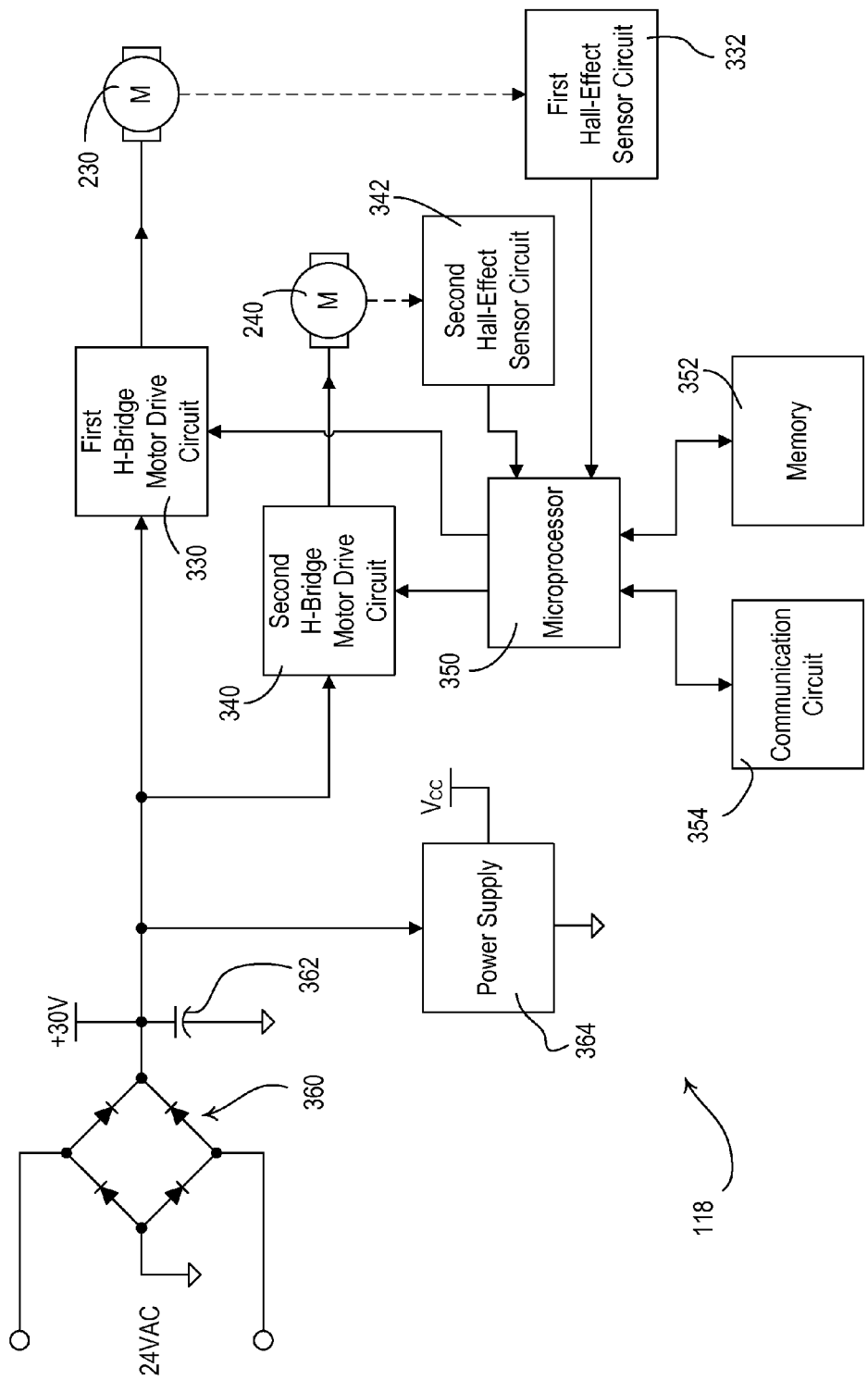
FIG. 11 is a simplified block diagram of the circuitry of the blind drive unit of the motorized venetian blind system of FIG. 1.

FIG. 11 is a simplified block diagram of the circuitry of the blind drive unit 118 of the motorized venetian blind system 110. The lift cord motor 230 and the tilt ladder motor 240 may each comprise, for example, a DC motor that is operable to rotate the respective drive shaft 232, 242 upon being energized by a DC voltage. The blind drive unit 118 comprises first and second H-bridge motor drive circuits 330, 340 for driving the lift cord motor 230 and the tilt ladder motor 240, respectively. The H-bridge motor drive circuits 330, 340 are controlled by a microprocessor 350, which is operable to individually adjust the rotational speed (i.e., angular velocity) and the direction of rotation of each of the lift cord motor 230 and the tilt ladder motor 240. The microprocessor 350 may be implemented as any suitable control circuit or controller, such as a programmable logic device (PLD), a microcontroller, an application specific integrated circuit (ASIC), or a field-programmable gate array (FPGA).

Each H-bridge motor drive circuit 330, 340 comprises four transistors, such as, for example, four field-effect transistors (not shown). The transistors are coupled such that, when two of the transistors are conductive, a positive DC voltage is applied to the respective motor 230, 240 to cause the motor to rotate in a forward direction. When the other two transistors of each H-bridge motor drive circuit 330, 340 are conductive, a negative DC voltage is applied to the respective motor 230, 240 to cause the motor to rotate in the reverse direction. To control the speed of the motors 230, 240, the microprocessor 350 drives at least one of the transistors of the respective H-bridge motor drive circuit 330, 340 with a pulse-width modulated (PWM) signal. For example, the microprocessor 350 can control the rotational speed of the lift cord motor 230 to a constant speed by controlling the first H-bridge motor drive circuit 330 to apply a constant DC voltage or a PWM signal having a constant duty cycle to the motor. Changing the magnitude of the DC voltage or the duty cycle of the PWM signal applied to the lift cord motor 230 will change the rotational speed of the motor. Further, the microprocessor 350 is operable to change the direction of rotation of the lift cord motor 230 by changing the polarity of the DC voltage or PWM signal applied to the motor. The microprocessor 350 is able to control the rotational speed of the lift cord motor 230 to control the linear speed of the bottom rail 116 to a constant linear speed as described in greater detail in U.S. Pat. No. 7,281,565, issued Oct. 16, 2007, entitled SYSTEM FOR CONTROLLING ROLLER TUBE ROTATIONAL SPEED FOR CONSTANT LINEAR SHADE SPEED, the entire disclosure of which is hereby incorporated by reference.

The blind drive unit 118 includes rotational position sensors, such as, for example, first and second Hall effect sensor (HES) circuits 332, 342. The first and second Hall effect sensor circuits 332, 334 are operable to provide information regarding the rotational speed and direction of the lift cord motor 230 and the tilt ladder motor 240 to the microprocessor 350. The rotational position sensors may also comprise other suitable position sensors, such as, for example, optical and resistive sensors. The Hall effect sensor circuits 332, 342 will be described in greater detail below with reference to FIGS. 12A and 12B. The microprocessor 350 is operable to determine the rotational positions of each of the lift cord motor 230 and the tilt ladder motor 240 in response to the Hall effect sensor circuits 332, 342, respectively. The microprocessor 350 uses the rotational position of the lift cord motor 230 to determine the present position $P_{BLIND}$ of the bottom rail 116 and the rotational position of the tilt ladder motor 240 to determine the present tilt angle $\theta_{BLIND}$ of the slats 112.

The microprocessor 350 is coupled to a memory 352 for storage of the present position $P_{BLIND}$ of the bottom rail 116 and the present tilt angle $\theta_{BLIND}$ of the slats 112. The memory 352 may be implemented as an external integrated circuit (IC) or as an internal circuit of the microprocessor 350, and may comprise a non-volatile memory, such as an electrically erasable programmable read-only memory (EEPROM). In addition, the memory 352 is operable to store programming information of the motorized venetian blind system 110. For example, the memory 352 may be operable to store predetermined presets including both a desired position $P_{PRESET}$ of the bottom rail 116 and a desired tilt angle $\theta_{PRESET}$ of the slats 112 for each of the predetermined presets. The predetermined presets may be programmed by a personal computer (not shown) that may be coupled to the RF communication link of the load control system 100 and may download the necessary programming information to the blind drive unit 118 during configuration of the load control system. The programming of an RF load control system is described in greater detail in U.S. Pat. No. 6,803,728, issued Oct. 12, 2004, entitled SYSTEM FOR CONTROL OF DEVICES, the entire disclosure of which is hereby incorporated by reference.

The blind drive unit 118 comprises a communication circuit 354 (e.g., an RF transceiver) that allows the microprocessor 350 to transmit and receive digital messages (via the RF signals 150) to and from the other control devices of the load control system 100. The microprocessor 350 is operable to receive a lift adjustment command for adjusting the position $P_{BLIND}$ of the bottom rail 116 and a tilt adjustment command for adjusting the tilt angle $\theta_{BLIND}$ of the slats 112 from, for example, one of the keypads 140, 142, via the digital messages. In addition, the microprocessor 350 is operable to receive a preset command via the digital messages, and may retrieve the desired position $P_{PRESET}$ of the bottom rail 116 and the desired tilt angle $\theta_{PRESET}$ of the slats 112 from the memory 352 in response to the specific preset included in the received preset command. Accordingly, the blind drive unit 118 is operable to control both the position $P_{BLIND}$ of the bottom rail 116 and the tilt angle $\theta_{BLIND}$ of the slats 112 in response to receiving a single digital message (i.e., a single preset command).

The blind drive unit 118 receives power from a 24-$V_{AC}$ source voltage generated by, for example, a transformer (not shown) coupled to the source of AC power (i.e., the AC mains voltage). The 24-$V_{AC}$ source voltage is provided to a full-wave bridge rectifier 360 for generating a bus voltage $V_{BUS}$, which is received by a storage capacitor 362 and has, for example, a nominal magnitude of approximately 30 $V_{DC}$. The bus voltage $V_{BUS}$ is provided to the H-bridge motor drive circuits 330, 340 for driving the respective motors 230, 240. A power supply 364 receives the bus voltage $V_{BUS}$ and generates a supply voltage $V_{CC}$ (e.g., 5 volts) for powering the low-voltage circuitry of the blind drive unit 118 (i.e., the microprocessor 350, the memory 352, and the communication circuit 354).

Figure 12A:
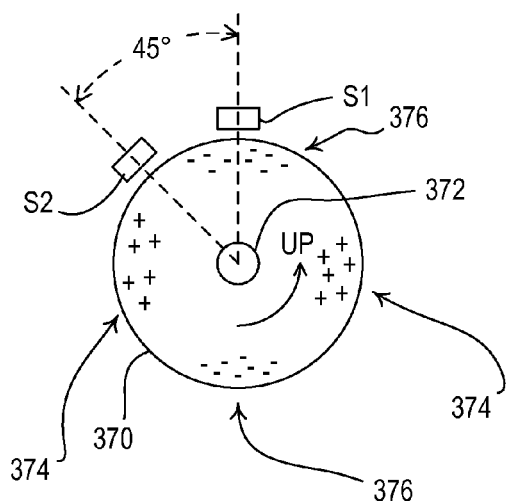
FIG. 12A is a partial schematic end view of a lift cord motor of the blind drive unit of FIG. 5 showing the physical assembly of a Hall effect sensor circuit.

FIG. 12A is a partial schematic end view of the lift cord motor 230 showing the physical assembly of the first Hall effect sensor circuit 332. The first Hall effect sensor circuit 332 comprises two Hall effect sensors S1, S2. The sensors S1, S2 are located in close proximity with a sensor magnet 370, which is secured to an output shaft 372 of the lift cord motor 230. The sensors S1, S2 are located adjacent the periphery of the magnet 370 and are separated from each other by, for example, approximately 45°. The sensor magnet 370 includes two positive poles 374 (i.e., "north" poles) and two negative poles 376 (i.e., "south" poles). Alternatively, the sensor magnet 370 may only include one positive pole and one negative pole.

Figure 12B:
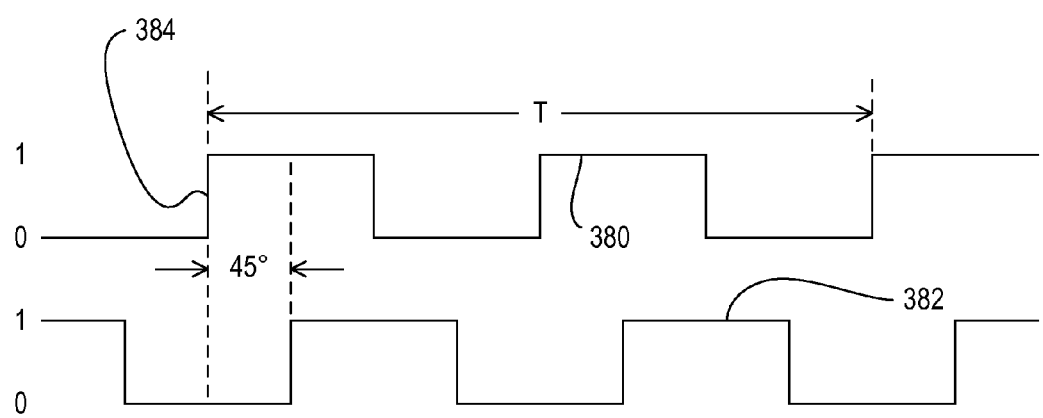
FIG. 12B is a diagram of a first output signal and a second output signal of the Hall effect sensor circuit of FIG. 12A.

FIG. 12B is a diagram of a first output signal 380 and a second output signal 382 of the sensors S1, S2, respectively. The sensors S1, S2 provide the output signals 380, 382 to the microprocessor 350 as a train of pulses in dependence upon whether each of the sensors are close to one of the positive poles 374 or one of the negative poles 376. For example, when the sensor magnet 370 rotates such that one of the north poles 374 moves near the first sensor S1 (rather than one of the adjacent negative poles 376), the first output signal 380 transitions from low (i.e., a logic zero) to high (i.e., a logic one) as shown by a Hall effect sensor edge 384 in FIG. 12B. Hall effect sensor edges may be either low-to-high transitions or high-to-low transitions of the first and second output signals 380, 382. When the sensor magnet 370 has two positive poles and two negative poles, the output signals 380, 382 have two rising edges and two falling edges per revolution of the output shaft 372.

The frequency, and thus the period T, of the pulses of the output signals 380, 382 is a function of the rotational speed of the motor output shaft 372. The relative spacing between the pulses of the first and second output signals 380, 382 is a function of rotational direction. When the lift cord motor 230 is rotating, such that the motor output shaft 372 rotates in a counterclockwise direction (marked "UP" in FIG. 12A), the second output signal 382 lags behind the first output signal 380 by approximately 45° or ⅛ of the period T (due to the spacing between the Hall effect sensors 51, S2). When the lift cord motor 230 is rotating in the opposite direction, the second output signal 382 leads the first output signal 380 by approximately 45°. The microprocessor 350 stores the present position $P_{BLIND}$ of the bottom rail 116 in the memory 352 as a number of Hall effect sensors edges between the present position of the shade fabric and the fully-raised position $P_{FR}$. The microcontroller 350 also stores the fully-raised position $P_{FR}$ and the fully-lowered position $P_{FL}$ in the memory 352 in terms of Hall effect sensor edges. During the configuration of the blind system 110, the fully-raised position $P_{FR}$ and the fully-lowered position $P_{FL}$ are set and stored in the memory 352.

The second Hall effect sensor circuit 342 operates in a similar manner as the first Hall effect sensor circuit 332 to generate output signals in response to the speed and direction of the tilt ladder motor 240. The operation of the H-bridge motor drive circuits 330, 340 and the Hall effect sensor circuits 332, 342 is described in greater detail in commonly-assigned U.S. Pat. No. 5,848,636, issued Dec. 15, 1998, entitled MOTORIZED WINDOW SHADE SYSTEM, and commonly-assigned U.S. Pat. No. 6,497,267, issued Dec. 24, 2002, entitled MOTORIZED WINDOW SHADE WITH ULTRAQUIET MOTOR DRIVE AND ESD PROTECTION, the entire disclosures of which are hereby incorporated by reference.

Figure 13:
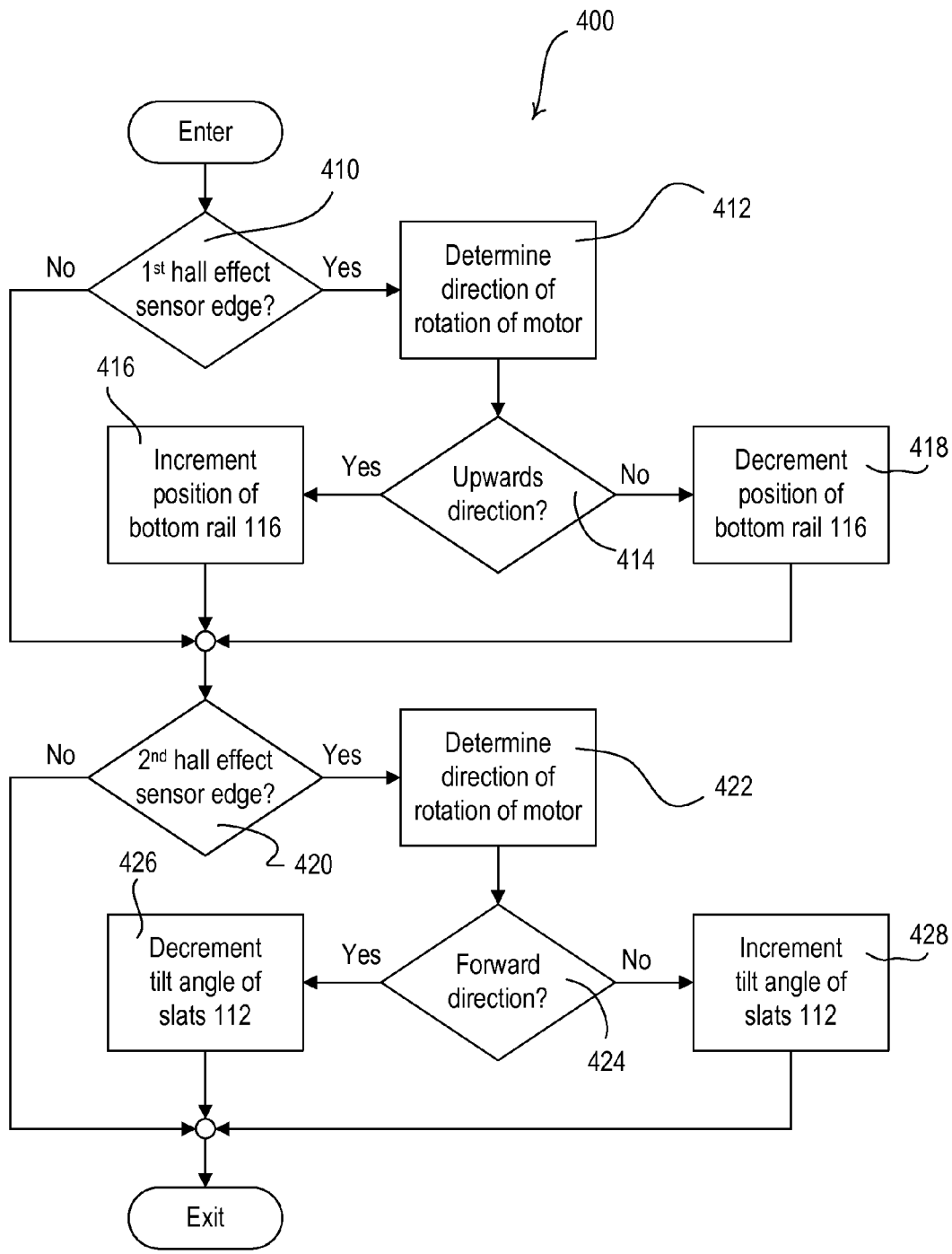
FIG. 13 is a simplified flowchart of a Hall effect sensor edge procedure executed periodically by a microprocessor of the blind drive unit of FIG. 5.

FIG. 13 is a simplified flowchart of a Hall effect sensor edge procedure 400 executed periodically by the microprocessor 350, e.g., every 572 μsec. If the microprocessor 350 has received a Hall effect sensor edge from the first Hall effect sensor circuit 332 at step 410, the microprocessor 350 determines the direction of rotation of the lift cord motor 230 by comparing the consecutive edges of the output signals of the first Hall effect sensor circuit (i.e., the first and second output signals 380, 382 shown in FIG. 12B) at step 412. For example, if the second output signal 382 is lagging behind the first output signal 380 by approximately 45°, the lift cord motor 230 is rotating the lift cord drive shaft 232 such that the bottom rail 116 is moving in the upward direction (as shown in FIG. 12A). If the lift cord motor 230 is rotating in the upward direction at step 414, the microprocessor 350 increments the present position $P_{BLIND}$ of the bottom rail 116 (i.e., in terms of Hall effect sensor edges) by one at step 416. If the lift cord motor 230 is rotating in the downward direction at step 414, the microprocessor 350 decrements the present position $P_{BLIND}$ of the bottom rail 116 by one at step 418.

If the microprocessor 350 has received a Hall effect sensor edge from the second Hall effect sensor circuit 342 at step 420, the microprocessor 350 determines the direction of rotation of the tilt ladder motor 240 by comparing the consecutive edges of the output signals of the second Hall effect sensor circuit at step 422. If the tilt ladder motor 240 is rotating in the forward direction at step 424, the microprocessor 350 decrements the present tilt angle $\theta_{BLIND}$ (i.e., in terms of Hall effect sensor edges) by one at step 426. If the tilt ladder motor 240 is rotating in the rear direction at step 424, the microprocessor 350 increments the present tilt angle $\theta_{BLIND}$ by one at step 428. After the present tilt angle $\theta_{BLIND}$ is adjusted at steps 426 and 428, the Hall effect sensor edge procedure 400 exits. If the microprocessor 350 has not received a Hall effect sensor edge from the first Hall effect sensor circuit 332 at step 410 or from the second Hall effect sensor circuit 342 at step 420, the Hall effect sensor edge procedure 400 simply exits.

Figure 14:
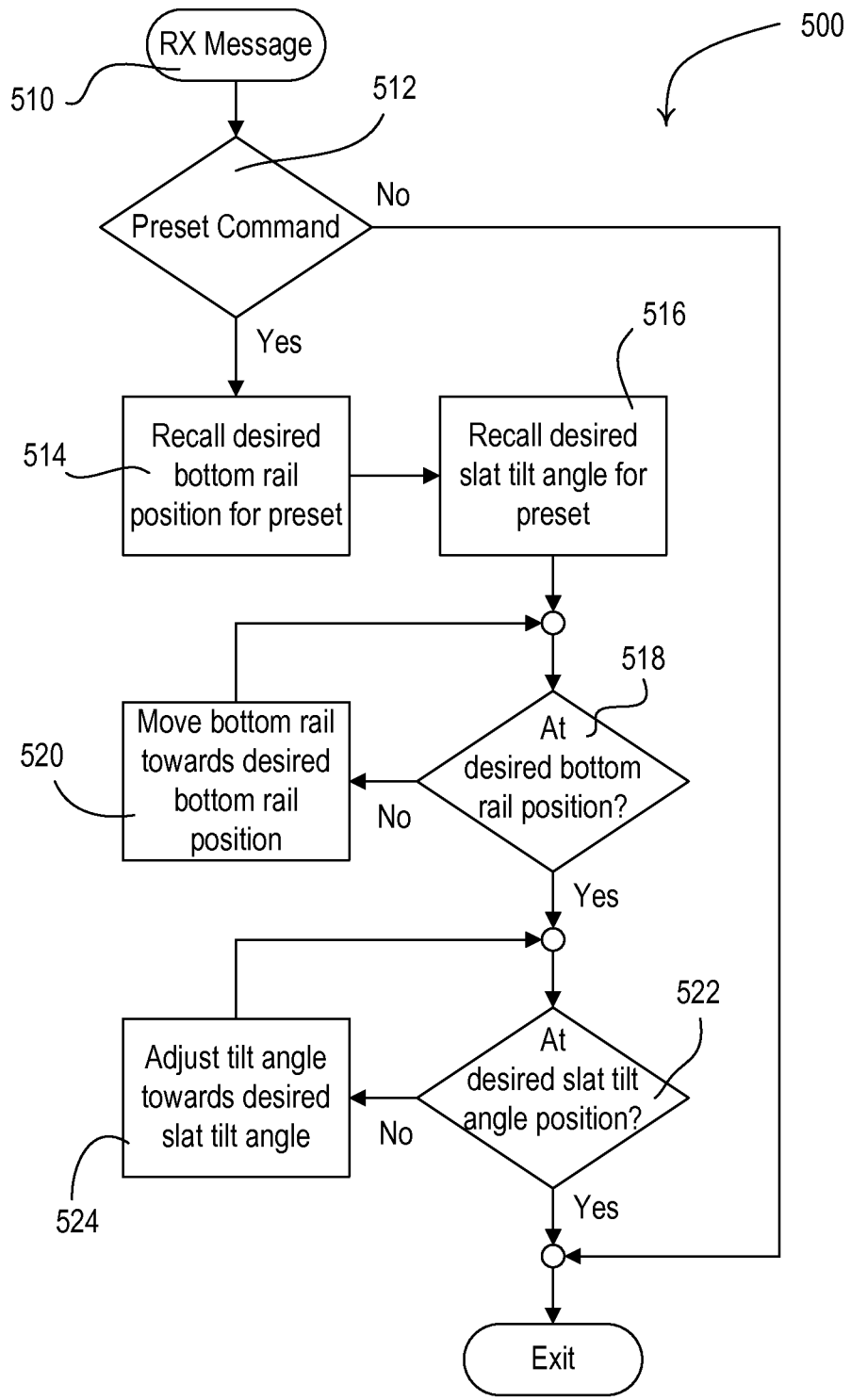
FIG. 14 is a simplified flowchart of a receive procedure executed by the microprocessor of the blind drive unit of FIG. 5 in response to receiving a wireless message.

FIG. 14 is a simplified flowchart of a receive procedure 500 executed by the microprocessor 350 when the communication circuit 354 receives a digital message via the RF signals 150 at step 510. If the received digital message is a preset command at step 512, the microprocessor 350 recalls the desired bottom rail position $P_{PRESET}$ for the specific preset included in the received digital message at step 514, and recalls the desired slat tilt angle $\theta_{PRESET}$ for the specific preset included in the received digital message at step 516. If the position $P_{BLIND}$ of the bottom rail 116 is not presently at the desired bottom rail position $P_{PRESET}$ at step 518, the microprocessor 350 moves the bottom rail 116 towards the desired bottom rail position $P_{PRESET}$ at step 520, e.g., by rotating the lift cord motor 230 at a constant angular velocity. The microprocessor 350 continues to move the bottom rail 116 toward the desired bottom rail position $P_{PRESET}$ at step 520 until the bottom rail 116 is at the desired bottom rail position $P_{PRESET}$ at step 518. Next, if the present tilt angle $\theta_{BLIND}$ is not at the desired slat tilt angle $\theta_{PRESET}$ at step 522, the microprocessor 350 controls the tilt ladder motor 240 to rotate the slats 112 toward the desired slat tilt angle $\theta_{PRESET}$ at step 524. When the present tilt angle $\theta_{BLIND}$ reaches the desired slat tilt angle $\theta_{PRESET}$ at step 524, the receive procedure 500 exits. In addition, the microprocessor 350 may be operable to receive separate commands for controlling the position $P_{BLIND}$ of the bottom rail 116 and the tilt angle $\theta_{BLIND}$ of the slats 112 (i.e., the lift adjustment command and the tilt adjustment command).

Figure 15:
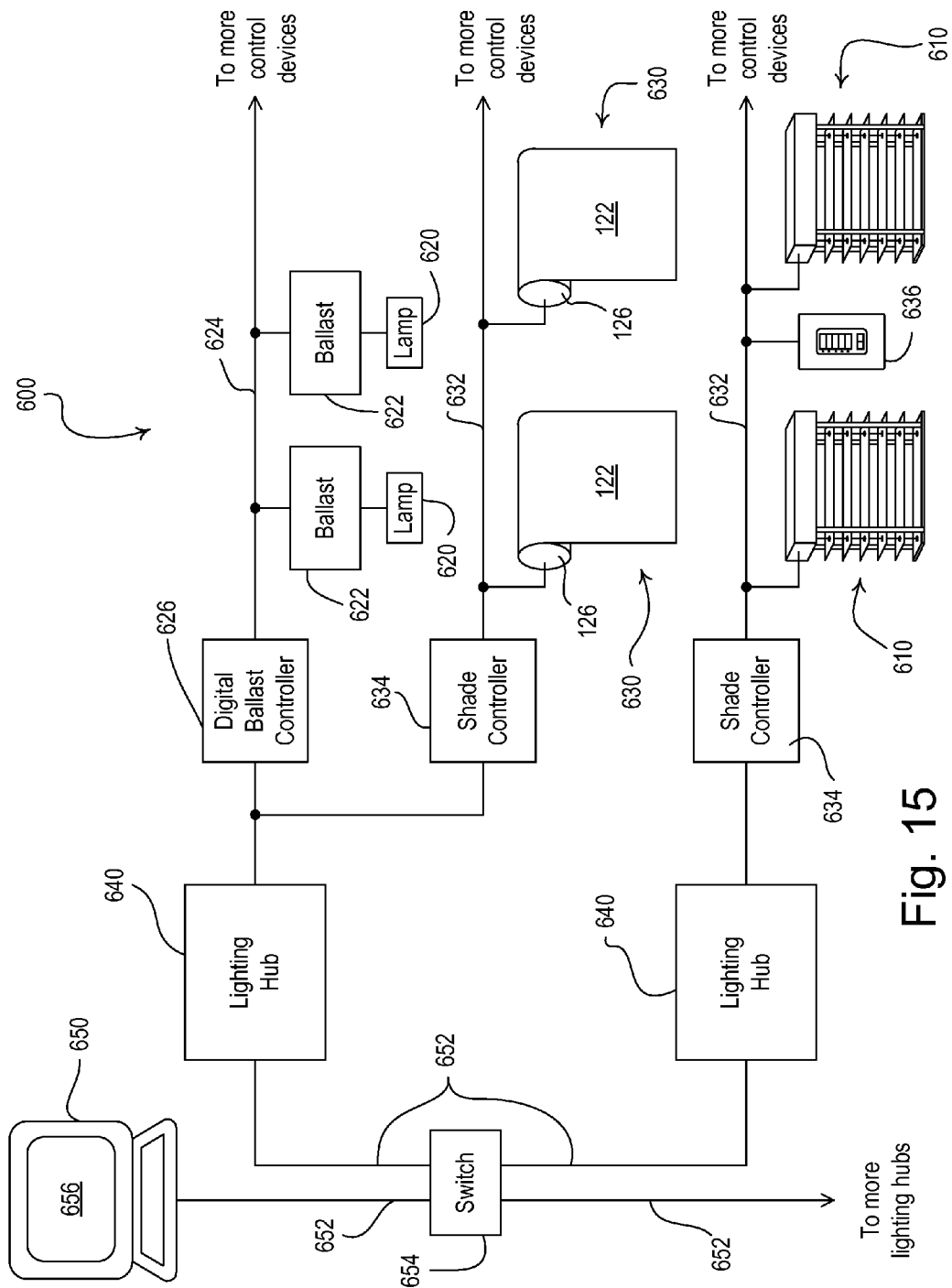
FIG. 15 is a simplified block diagram of a load control system having multiple motorized venetian blind systems according to a second embodiment of the present invention.

FIG. 15 is a simplified block diagram of a load control system 600 having multiple venetian blind systems 610 according to a second embodiment the present invention. The control devices of the load control system 600 are operable to communication with each other via wired communication links as will be described below. The load control system 600 is operable to control the level of illumination in a space by controlling the intensity level of the electrical lights in the space and the daylight entering the space. Specifically, the load control system 600 is operable to control the amount of power delivered to (and thus the intensity of) a plurality of lighting loads, e.g., a plurality of fluorescent lamps 620, and to control the positions $P_{BLIND}$ of the bottom rails 116 and the tilt angles $\theta_{BLIND}$ of the slats 112 of the motorized blind systems 610, as well as fabric positions of motorized roller shades 630, to thus control the amount of sunlight entering the space. The load control system 600 could comprise other types of motorized window treatments, such as, for example, motorized draperies or roman shades.

Each of the fluorescent lamps 620 is coupled to one of a plurality of digital electronic dimming ballasts 622 for controlling the intensities of the lamps. The ballasts 622 are operable to communicate with each other via wired digital ballast communication links 624. For example, the digital ballast communication link 624 may comprise a digital addressable lighting interface (DALI) communication link. Each digital ballast communication link 624 is also coupled to a digital ballast controller (DBC) 626, which provides the necessary direct-current (DC) voltage to power the communication link 624 and assists in the programming of the load control system 600. The ballasts 622 are operable to transmit digital messages to the other ballasts 622 via the digital ballast communication link 624.

As in the first embodiment, the motorized venetian blind systems 610 include blind drive units 118 and the motorized roller shades 630 include shade drive units 126. The blind drive units 118 and the shade drive unit 126 are responsive to digital messages received via wired window treatment communication links 632. Window treatment controllers (SC) 634 are coupled to the window treatment communication links 632 and operate to facilitate the communication of digital messages between the control devices of the load control system 600. The load control system 600 further comprises a wallstation 636, which is operable to transmit digital messages to the blind drive units 118, e.g., to adjust the tilt angle $\theta_{BLIND}$ of the slats 112 or the position $P_{BLIND}$ of the bottom rail 116 of the each of the blind systems 610 between the fully-raised position $P_{FR}$ and the fully-lowered position $P_{FL}$. In addition, the user may use the wallstation 636 to adjust the position of the shade fabric 122 of each of the motorized roller shades 630, e.g., to preset shade positions between an open-limit position (e.g., a fully-open position $P_{FO}$) and a closed-limit position (e.g., a fully-closed position $P_{FC}$). An example of a motorized window treatment control system is described in greater detail in commonly-assigned U.S. Pat. No. 6,983,783, issued Jun. 11, 2006, entitled MOTORIZED SHADE CONTROL SYSTEM, the entire disclosure of which is hereby incorporated by reference.

A plurality of lighting hubs 640 act as central controllers for managing the operation of the load control devices of the load control system 600 (i.e., the ballasts 620, the blind drive units 118 of the blind systems 610, and the shade drive units 126 of the motorized roller shades 630). Each lighting hub 640 is operable to be coupled to at least one of the digital ballast controllers 626 to allow the lighting hub to communicate with the ballasts 622 on one of the digital ballast communication links 624. Each lighting hub 640 is further operable to be coupled to at least one of the window treatment controllers 634 to allow the lighting hub to communicate with the blind drive units 118 of the blind systems 610 and the shade drive units 126 of the motorized roller shades 630 on one of the window treatment communication links 632. The lighting hubs 640 may be further coupled to a personal computer (PC) 650 via an Ethernet link 652 and a standard Ethernet switch 654, such that the PC is operable to transmit digital messages to the ballasts 622, the blind drive units 118 of the blind systems 610, and the shade drive units 126 of the motorized roller shades 630 via the lighting hubs 640. The PC 650 executes a graphical user interface (GUI) software, which is displayed on a PC screen 656. The GUI software allows the user to configure and monitor the operation of the load control system 600.

According to the second embodiment of the present invention, the lighting hubs 640 are operable to transmit digital messages to the venetian blind systems 610 to control the amount of sunlight entering a space 700 (FIG. 16) of a building to control a direct sunlight penetration distance $d_{P-DIR}$ and a reflected sunlight penetration distance $d_{P-REF}$ in the space. Each lighting hub 640 comprises an astronomical timeclock and is able to determine a sunrise time $t_{SUNRISE}$ and a sunset time $t_{SUNSET}$ for each day of the year for a specific location. The lighting hubs 640 each transmit commands to the blind drive units 118 to automatically control the blind systems 610 in response to a timeclock schedule. Alternatively, the PC 650 could comprise the astronomical timeclock and could transmit the digital messages to the blind systems 610 to control the direct sunlight penetration distance $d_{P-DIR}$ and the reflected sunlight penetration distance $d_{P-REF}$ in the space 700.

Figure 16:
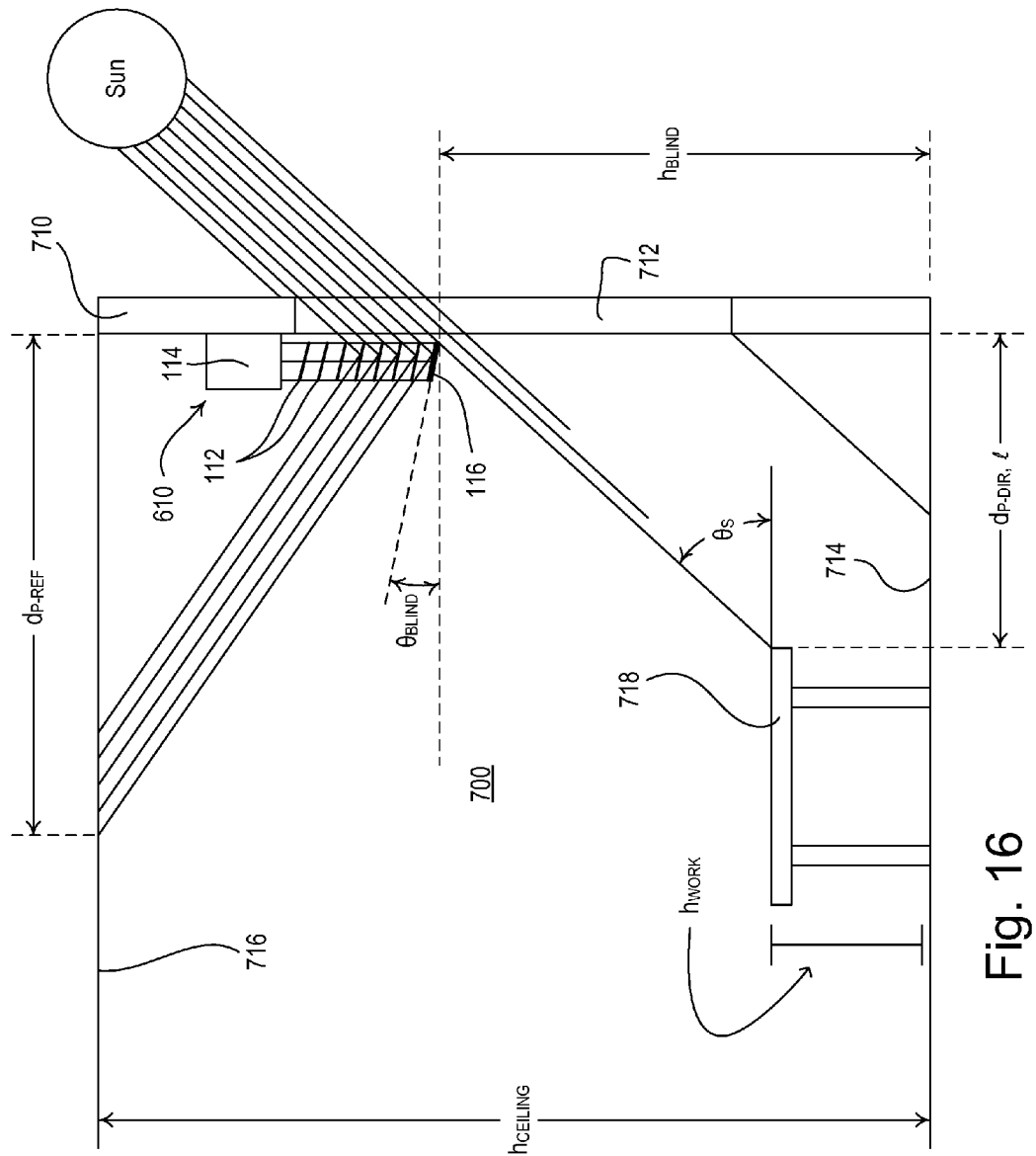
FIG. 16 is a simplified side view of an example of a space of a building having a window covered by one of the motorized venetian blind systems of the load control system of FIGS. 15.

FIG. 16 is a simplified side view of an example of the space 700 illustrating the direct sunlight penetration distance $d_{P-DIR}$ and the reflected sunlight penetration distance $d_{P-REF}$, which may be controlled by at least one of the motorized blind systems 610 in the space. As shown in FIG. 16, the building comprises a façade 710 (e.g., one side of a four-sided rectangular building) having a window 712 for allowing sunlight to enter the space. The space 700 also comprises a floor 714, a ceiling 716 positioned at a height $h_{CEILING}$ from the floor, and a work surface, e.g., a table 718, which sits at a height $h_{WORK}$ from the floor. The motorized blind system 610 is mounted above the window 712, such that the slats 112 hang in front of the window and the bottom rail 116 is positioned at a height $h_{BLIND}$ from the floor 714. The height $h_{BLIND}$ of the bottom rail 116 is variable and changes as the blind drive unit 118 moves the bottom rail between the fully-raised position $P_{FR}$ and the fully-lowered position $P_{FL}$.

The direct sunlight penetration distance $d_{P-DIR}$ is the distance from the window 712 and the façade 710 at which direct sunlight shines into the space 700 along the floor 714 or at the height $h_{WORK}$ of the table 718 (as shown in FIG. 16). The blind drive unit 118 is operable to adjust the position $P_{BLIND}$ of the bottom rail 116 to one of a plurality of preset positions between the fully-raised position $P_{FR}$ and the fully-lowered position $P_{FL}$ and to adjust the tilt angle $\theta_{BLIND}$ of the slats 112, so as to control the length of the direct sunlight penetration distance $d_{P-DIR}$. According to the second embodiment of the present invention, the blind system 610 is controlled such that the direct sunlight penetration distance $d_{P-DIR}$ is limited to less than a desired maximum direct sunlight penetration distance $d_{P-DIR-MAX}$ during all times of the day. For example, the direct sunlight penetration distance $d_{P-DIR}$ may be limited such that the sunlight does not shine directly on the table 718 to prevent sun glare on the table.

The direct sunlight penetration distance $d_{P-DIR}$ is a function of the height $h_{BLIND}$ of the bottom rail 116 and an angle $\Phi_F$ of the façade 710 with respect to true north, as well as a solar elevation angle $\theta_S$ and a solar azimuth angle $\Phi_S$, which define the position of the sun in the sky. The solar elevation angle $\theta_S$ and the solar azimuth angle $\Phi_S$ are functions of the present date and time, as well as the position (i.e., the longitude and latitude) of the building in which the space 700 is located. The solar elevation angle $\theta_S$ is essentially the angle between a line directed towards the sun and a line directed towards the horizon at the position of the building. The solar elevation angle $\theta_S$ can also be thought of as the angle of incidence of the sun's rays on a horizontal surface. The solar azimuth angle $\Phi_S$ is the angle formed by the line from the observer to true north and the line from the observer to the sun projected on the ground. When the solar elevation angle $\theta_S$ is small (i.e., around sunrise and sunset), small changes in the position of the sun result in relatively large changes in the magnitude of the direct sunlight penetration distance $d_{P-DIR}$.

Figure 17A:
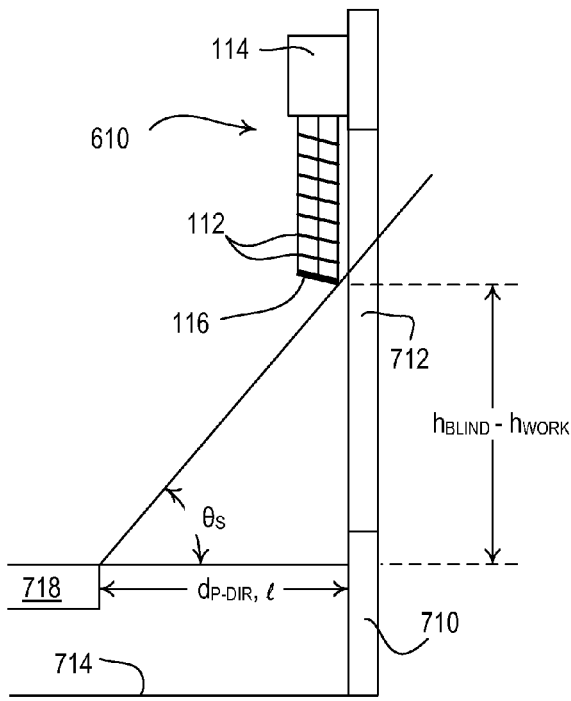
FIG. 17A is a side view of the window of FIG. 16 illustrating a sunlight penetration depth.
Figure 17B:
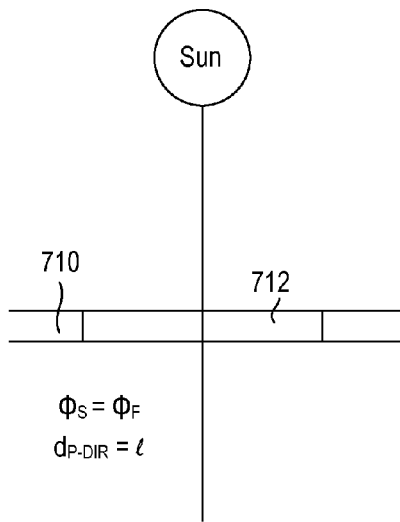
FIG. 17B is a top view of the window of FIG. 16 when the sun is directly incident upon the window.
Figure 17C:
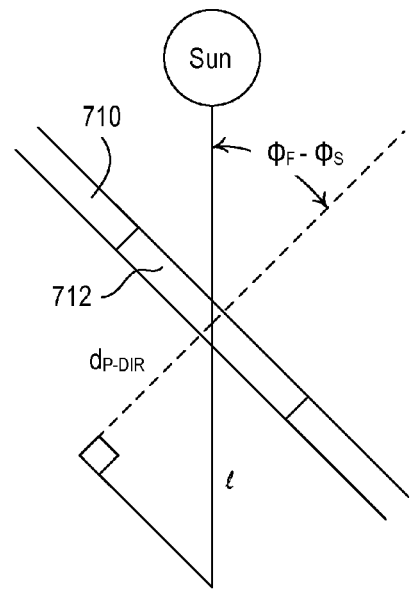
FIG. 17C is a top view of the window of FIG. 16 when the sun is not directly incident upon the window.

FIGS. 17A-17C are partial views of the space 700 illustrating the theoretical calculation of the direct sunlight penetration distance $d_{P-DIR}$ in the space. The direct sunlight penetration distance $d_{P-DIR}$ of direct sunlight onto the table 718 of the space 700 (which is measured normal to the surface of the window 712) can be determined by first calculating a length l of the deepest penetrating ray of light (which is parallel to the path of the floor 714 and extends in the direction of the sun as shown the top views of the window 712 in FIGS. 17B and 17C). The length l of the deepest penetrating ray of light can be calculated by considering a triangle formed by a line directed from the table 718 towards the sun, the difference between the height $h_{BLIND}$ of the bottom rail 116 of the blind system 610 and the height $h_{WORK}$ of the table 718, and the length l from the table 718 to the window 712 in the direction of the sun as shown in the side view of the window 712 in FIG. 17A, i.e., $$\tan(\theta_S)=(h_{BLIND}-h_{WORK})/l, \quad \text{(Equation 1)}$$

where $\theta_S$ is the solar elevation angle of the sun at a given date and time for a given location (i.e., longitude and latitude) of the building.

The direct sunlight penetration distance $d_{P-DIR}$ of direct sunlight onto the table 718 of the space 700 can then be determined from the length l of the deepest penetrating ray of light, the solar azimuth angle $\Phi_S$, and the façade angle $\Phi_F$. If the sun is directly incident upon the window 712, the solar azimuth angle $\Phi_S$ and the façade angle $\Phi_F$ (i.e., with respect to true north) are equal as shown by the top view of the window 712 in FIG. 17B. Accordingly, the direct sunlight penetration distance $d_{P-DIR}$ equals the length l of the deepest penetrating ray of light. However, if the façade angle $\Phi_F$ is not equal to the solar azimuth angle $\Phi_S$, the direct sunlight penetration distance $d_{P-DIR}$ onto the table 718 is a function of the cosine of the difference between the façade angle $\Phi_F$ and the solar azimuth angle $\Phi_S$, i.e., $$d_{P-DIR}=l \cdot \cos(|\Phi_F-\Phi_S|), \quad \text{(Equation 2)}$$

as shown by the top view of the window 712 in FIG. 17C.

As previously mentioned, the solar elevation angle $\theta_S$ and the solar azimuth angle $\Phi_S$ define the position of the sun in the sky and are functions of the position (i.e., the longitude and latitude) of the building in which the space 700 is located and the present date and time. The following equations are necessary to approximate the solar elevation angle $\theta_S$ and the solar azimuth angle $\Phi_S$. The equation of time defines essentially the difference in a time as given by a sundial and a time as given by a clock. This difference is due to the obliquity of the Earth's axis of rotation. The equation of time can be approximated by $$E=9.87 \cdot \sin(2B)-7.53 \cdot \cos(B)-1.5 \cdot \sin(B), \quad \text{(Equation 3)}$$

where $B=[360° \cdot (N_{DAY}-81)]/364$, and $N_{DAY}$ is the present day-number for the year (e.g., $N_{DAY}$ equals one for January 1, $N_{DAY}$ equals two for January 2, and so on).

The solar declination $\delta$ is the angle of incidence of the rays of the sun on the equatorial plane of the Earth. If the eccentricity of Earth's orbit around the sun is ignored and the orbit is assumed to be circular, the solar declination is given by:

$$\delta=23.45° \cdot \sin[360°/365 \cdot (N_{DAY}+284)]. \quad \text{(Equation 4)}$$

The solar hour angle H is the angle between the meridian plane and the plane formed by the Earth's axis and current location of the sun, i.e., $$H(t)=\{¼ \cdot [t+E-(4 \cdot \lambda)+(60 \cdot t_{TZ})]\}-180°, \quad \text{(Equation 5)}$$

where t is the present local time of the day, $\lambda$ is the local longitude, and $t_{TZ}$ is the time zone difference (in unit of hours) between the local time t and Greenwich Mean Time (GMT). For example, the time zone difference $t_{TZ}$ for the Eastern Standard Time (EST) zone is −5. The time zone difference $t_{TZ}$ can be determined from the local longitude $\lambda$ and latitude $\phi$ of the building. For a given solar hour angle H, the local time can be determined by solving Equation 5 for the time t, i.e., $$t=720+4 \cdot (H+\lambda)-(60 \cdot t_{TZ})-E. \quad \text{(Equation 6)}$$

When the solar hour angle H equals zero, the sun is at the highest point in the sky, which is referred to as "solar noon" time $t_{SN}$, i.e., $$t_{SN}=720+(4 \cdot \lambda)-(60 \cdot t_{TZ})-E. \quad \text{(Equation 7)}$$

A negative solar hour angle H indicates that the sun is east of the meridian plane (i.e., morning), while a positive solar hour angle H indicates that the sun is west of the meridian plane (i.e., afternoon or evening).

The solar elevation angle $\theta_S$ as a function of the present local time t can be calculated using the equation:

$$\theta_S(t)=\sin^{-1}[\cos(H(t)) \cdot \cos(\delta) \cdot \cos(\phi)+\sin(\delta) \cdot \sin(\phi)], \quad \text{(Equation 8)}$$

wherein $\phi$ is the local latitude. The solar azimuth angle $\Phi_S$ as a function of the present local time t can be calculated using the equation:

$$\theta_S(t)=180° \cdot C(t) \cdot \cos^{-1}[X(t)/\cos(\theta_S(t))], \quad \text{(Equation 9)}$$

where $$X(t)=[\cos(H(t)) \cdot \cos(\delta) \cdot \sin(\phi)-\sin(\delta) \cdot \cos(\phi)], \quad \text{(Equation 10)}$$

and C(t) equals negative one if the present local time t is less than or equal to the solar noon time $t_{SN}$ or one if the present local time t is greater than the solar noon time $t_{SN}$. The solar azimuth angle $\theta_S$ can also be expressed in terms independent of the solar elevation angle $\theta_S$, i.e., $$\Phi_S(t)=\tan^{-1}[-\sin(H(t)) \cdot \cos(\delta)/Y(t)], \quad \text{(Equation 11)}$$

where $$Y(t)=[\sin(\delta) \cdot \cos(\phi)-\cos(\delta) \cdot \sin(\phi) \cdot \cos(H(t))]. \quad \text{(Equation 12)}$$

Thus, the solar elevation angle $\theta_S$ and the solar azimuth angle $\Phi_S$ are functions of the local longitude $\lambda$ and latitude $\phi$ and the present local time t and date (i.e., the present day-number $N_{DAY}$). Using Equations 1 and 2, the direct sunlight penetration distance $d_{P-DIR}$ can be expressed in terms of the height $h_{WIN}$ of the window 712, the height $h_{WORK}$ of the table 718, the solar elevation angle $\theta_S$, and the solar solar azimuth angle $\Phi_S$.

The reflected sunlight penetration distance $d_{P-REF}$ is the distance from the window 712 and the façade 710 at which sunlight directed off of the slats 112 of the motorized blind system 110 shines into the space 700 along the ceiling 716 (as shown in FIG. 16). The blind drive unit 118 is operable to control the length of the reflected sunlight penetration distance $d_{P-REF}$ by adjusting the tilt angle $\theta_{BLIND}$ of the slats 112. The reflected sunlight penetration distance $d_{P-REF}$ onto the ceiling 716 can be calculated as a function of the height $h_{CEILING}$ of the ceiling 716, the height $h_{BLIND}$ of the bottom rail 116 of the blind drive system 610, the tilt angle $\theta_{BLIND}$ of the slats 112, the angle $\Phi_F$ of the façade 710 with respect to true north, the solar elevation angle $\theta_S$, and the solar azimuth angle $\Phi_S$.

In addition, the slats 112 may each comprise a highly reflective surface operable to directly reflect the sunlight onto the ceiling 716 without diffusing much additional sunlight within the space 700 as illustrated in FIG. 16. However, the slats 112 may alternatively be comprised of various materials having a wide array of colors, textures, and shapes. The material of the slats 112 may affect the way in which the sunlight is directly reflected and/or diffused within the space 700.

According to the second embodiment of the present invention, the blind system 110 is controlled such that the reflected sunlight penetration distance $d_{P-REF}$ is maximized. However, the reflected sunlight penetration distance $d_{P-REF}$ may also be limited to be less than a desired maximum reflected onto a daylight sensor mounted on the ceiling 716 of the space 710. The direct sunlight penetration distance $d_{P-DIR}$ and the reflected sunlight penetration distance $d_{P-REF}$ may be controlled to different distances or may be controlled to be approximately equal.

According to the second embodiment of the present invention, the blind drive unit 118 may only tilt the slats 112 towards the rear, i.e., towards the window 712 (as shown in FIG. 16), when direct sunlight is shining on the window, such that direct sunlight is prevented from shining on the table 718. In addition, the tilt angle $\theta_{BLIND}$ of the slats 112 may be controlled between a minimum tilt angle $\theta_{BLIND-MIN}$ (as measured from the initial horizontal position) and a maximum tilt angle $\theta_{BLIND-MAX}$ (in which the slats 112 are in the fully rear-tilted position). The minimum tilt angle $\theta_{BLIND-MIN}$ may be sized to ensure that direct sunlight does not shine through the slats 112 on the table 718. In addition, the width of the slats 112 (in the direction perpendicular to the window 712) may be sized to be great enough to ensure that direct sunlight does not shine through the slats 112 on the table 718. Further, the minimum tilt angle $\theta_{BLIND-MIN}$ may be increased when the bottom rail 116 is positioned near the fully-lowered position $P_{FL}$ to prevent sunlight from shining into the eyes of an occupant sitting at the table 718. Alternatively, the position $P_{BLIND}$ of the bottom rail 116 may be fixed (e.g., at the fully-lowered position $P_{FL}$), such that the lighting hubs 640 are only operable to control the tilt angle $\theta_{BLIND}$ of the slats 112 to control the reflected sunlight penetration distance $d_{P-REF}$ on the ceiling 716. According to a further alternative embodiment, the tilt angle $\theta_{BLIND}$ of the slats 112 could be fixed at the maximum tilt angle $\theta_{BLND-MAX}$ such that the lighting hubs 640 are only operable to control position $P_{BLIND}$ of the bottom rail 116 to control the direct sunlight penetration distance $d_{P-DIR}$.

The desired maximum direct sunlight penetration distance $d_{P-DIR-MAX}$ and the desired maximum reflected sunlight penetration distance $d_{P-REF-MAX}$ may be entered using the GUI software of the PC 650 and may be stored in memory in each of the lighting hubs 640. In addition, the user may also use the GUI software of the PC 650 to enter and the present date and time, the present timezone, the local longitude $\lambda$ and latitude $\phi$ of the building, the façade angle $\Phi_F$ for each façade 710 of the building, the height $h_{WIN}$ of the windows 712 in spaces 700 of the building, and the heights $h_{WORK}$ of the workspaces (i.e., tables 718) in the spaces of the building. These operational characteristics (or a subset of these operational characteristics) may also be stored in the memory of each lighting hub 640. Further, the motorized blind systems 610 are also controlled such that distractions to an occupant of the space 700 (i.e., due to automatic adjustments of the motorized blind systems) are minimized.

Each of the lighting hubs 640 of the load control system 600 automatically controls the motorized venetian blind systems 610 in response to a timeclock schedule that defines the desired operation of the motorized blind systems 610 on each of the façades 710 of the building. Specifically, during a timeclock execution procedure 900, each lighting hub 640 controls the position $P_{BLIND}$ of the bottom rail 116 and the tilt angle $\theta_{BLIND}$ of the slats 112 of each of the motorized blind systems 610 at predetermined event times, such that the direct sunlight penetration distance $d_{P-DIR}$ is limited to less than the desired maximum direct sunlight penetration distance $d_{P-DIR-MAX}$ and the reflected sunlight penetration distance $d_{P-REF}$ is maximized. The lighting hubs 640 also each periodically execute a timeclock configuration procedure 800 to generate the timeclock schedule that defines the desired operation of the motorized blind systems 610. For example, the timeclock configuration procedure 800 may be executed by each of the lighting hubs 640 once each day at midnight to generate a new timeclock schedule for the motorized blind systems 610 connected to the respective lighting hub via the window treatment communication link 632.

In order to minimize distractions of an occupant in the space 700 due to movements of the motorized blind systems 610, the user may input a minimum time period $T_{MIN}$ that may exist between any two consecutive adjustments of the motorized blind systems. The minimum time period $T_{MIN}$ that may exist between any two consecutive adjustments of the motorized blind systems 610, the desired maximum direct sunlight penetration distance $d_{P-DIR-MAX}$, the desired maximum reflected sunlight penetration distance $d_{P-REF-MAX}$ may be entered using the GUI software of the PC 650 and may be stored in the memory in the lighting hubs 640. Alternatively, the GUI software may be implemented on other user interface devices that form part of the system 600. The user may select different values for the desired maximum direct sunlight penetration distance $d_{P-DIR-MAX}$, the desired maximum reflected sunlight penetration distance $d_{P-REF-MAX}$, and the minimum time period $T_{MIN}$ between blind adjustments for different areas and different groups of motorized blind systems 610 in the building. In other words, a different timeclock schedule may be executed for the different areas and different groups of motorized blind systems 610 in the building (i.e., the different façades 710 of the building).

Figure 18:
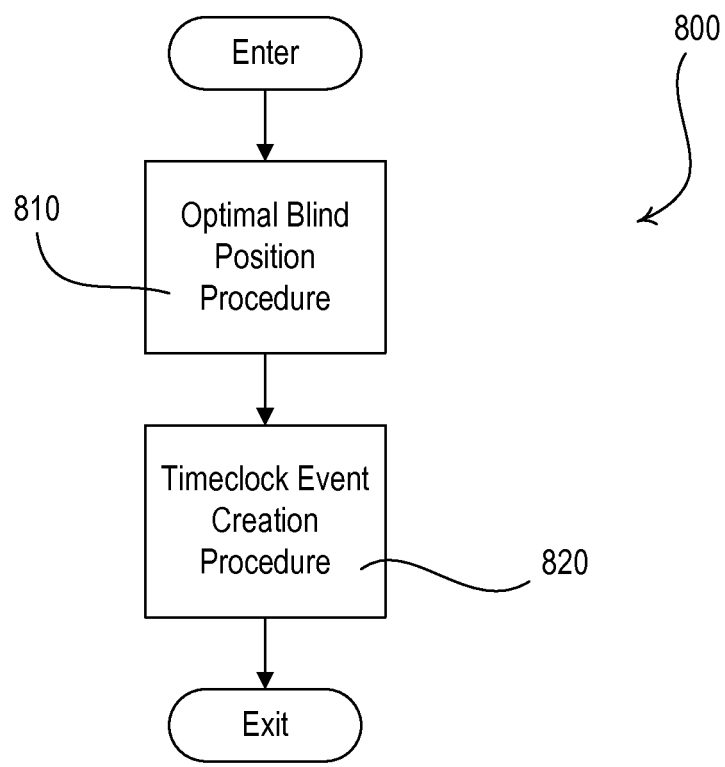
FIG. 18 is a simplified flowchart of a timeclock configuration procedure executed periodically by a central controller of the load control system of FIG. 15 according to the second embodiment of the present invention.

FIG. 18 is a simplified flowchart of the timeclock configuration procedure 800, which is executed periodically by the lighting hub 640 of the load control system 600 to generate a timeclock schedule defining the desired operation of the motorized blind systems 610 of each of the façades 710 of the building according to the second embodiment of the present invention. For example, the timeclock configuration procedure 400 may be executed once each day at midnight to generate a new timeclock schedule for one or more areas in the building. The timeclock schedule is generated between a start time $t_{START}$ and an end time $t_{END}$ of the present day. During the timeclock configuration procedure 800, the lighting hub 640 first performs an optimal blind position procedure 810 for determining optimal positions $P_{OPT}(t)$ of the bottom rail 116 and optimal tilt angles $\theta_{OPT}(t)$ of the slats 112 of the motorized blind systems 610 for each minute between the start time $t_{START}$ and the end time $t_{END}$ of the present day in order to limit the direct sunlight penetration distance $d_{P\text{-}DIR}$ to the desired maximum sunlight penetration distance $d_{P\text{-}DIR\text{-}MAX}$ and to maximize the reflected sunlight penetration distance $d_{P\text{-}REF}$.

The lighting hub 640 then executes a timeclock event creation procedure 820 to generate the events of the timeclock schedule in response to the optimal positions $P_{OPT}(t)$ of the bottom rail 116, the optimal tilt angles $\theta_{OPT}(t)$ of the slats 112, and the user-selected minimum time period $T_{MIN}$ between blind adjustments. According to the second embodiment, the timeclock schedule is split up into a number of consecutive time intervals, each having a length equal to the minimum time period $T_{MIN}$ between blind adjustments. During the timeclock event creation procedure 820, the lighting hub 640 considers each time interval and determines controlled positions $P_{CNTL}(t)$ of the bottom rail 116 and controlled tilt angles $\theta_{CNTL}(t)$ of the slats 112 defining how the motorized blind systems 610 will be controlled to prevent the direct sunlight penetration distance $d_{P\text{-}DIR}$ from exceeding the desired maximum sunlight penetration distance $d_{MAX}$ and to maximize the reflected sunlight penetration distance $d_{P\text{-}REF}$ during the respective time interval.

The lighting hub 640 creates events in the timeclock schedule, each having an event time equal to the beginning of a respective time interval, a corresponding controlled position $P_{CNTL}(t)$, and a corresponding controlled tilt angle $\theta_{CNTL}(t)$. The lighting hub 140 uses the optimal positions $P_{OPT}(t)$ of the bottom rail 116 and the optimal tilt angles $\theta_{OPT}(t)$ of the slats 112 from the optimal blind position procedure 810 to correctly determine the controlled positions $P_{CNTL}(t)$ and the controlled tilt angles $\theta_{CNTL}(t)$ of the events of the timeclock schedule. The lighting hub 640 will not create a timeclock event when the determined position of a specific time interval is equal to the determined position of a preceding time interval. Therefore, the event times of the timeclock schedule are spaced apart by multiples of the user-specified minimum time period $T_{MIN}$ between blind adjustments.

Figure 19:
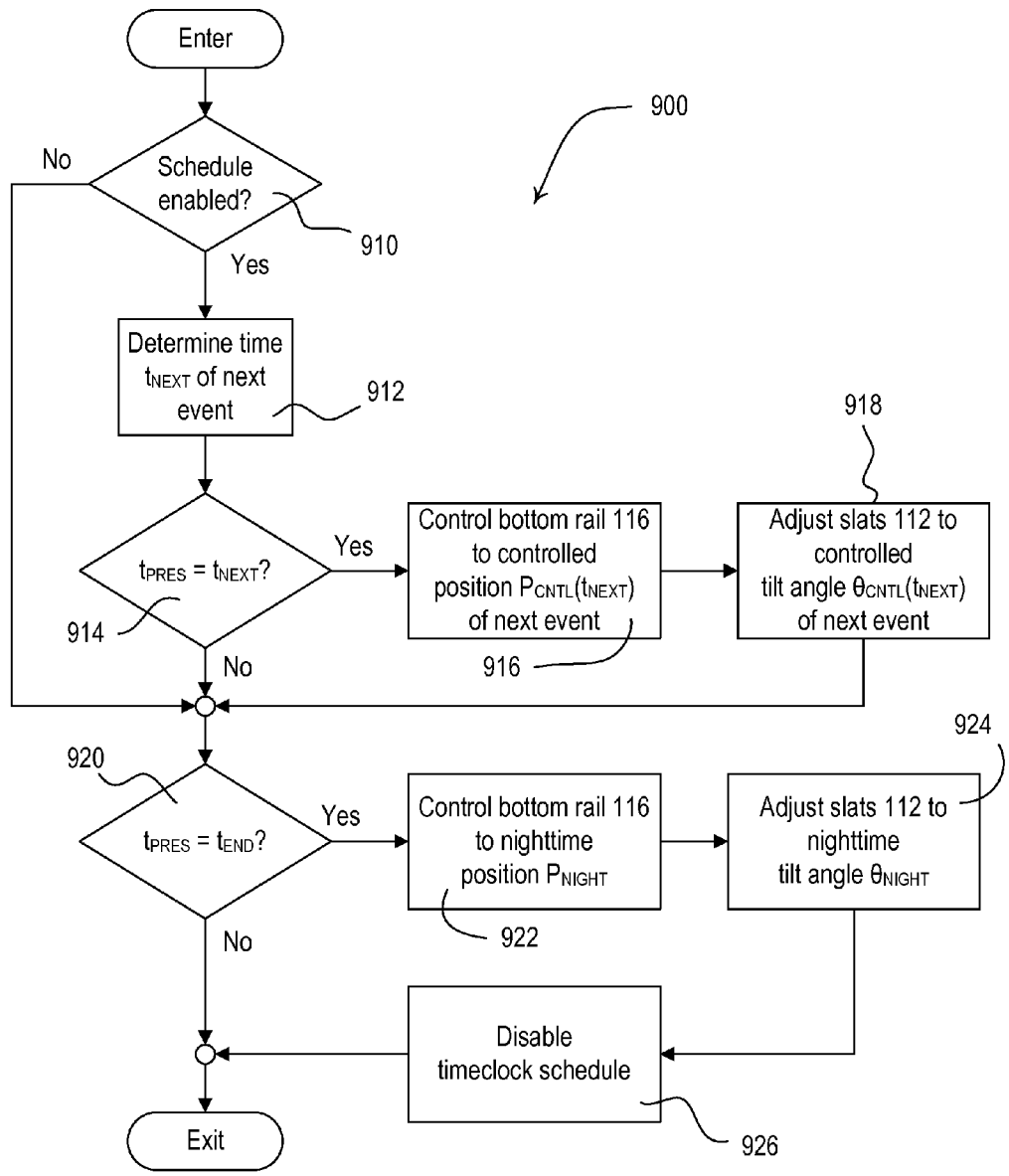
FIG. 19 is a simplified flowchart of a timeclock schedule execution procedure executed by the central controller of the load control system of FIG. 15 according to the second embodiment of the present invention.

The lighting hub 640 uses the controlled positions $P_{CNTL}(t)$ and the controlled tilt angles $\theta_{CNTL}(t)$ to adjust the position of the motorized blind systems 610 during execution of the timeclock schedule, i.e., between the start time $t_{START}$ and the end time $t_{END}$. FIG. 19 is a simplified flowchart of the timeclock schedule execution procedure 900, which is executed by the lighting hub 640 periodically, e.g., every minute between the start time $t_{START}$ and the end time $t_{END}$ of the timeclock schedule. Since there may be multiple timeclock schedules for the motorized blind systems 610 controlled by each of the lighting hubs 640, each lighting hub may execute the timeclock schedule execution procedure 900 multiple times, e.g., once for each timeclock schedule.

Referring to FIG. 19, if the timeclock schedule is enabled at step 910, the lighting hub 640 determines the time $t_{NEXT}$ of the next timeclock event from the timeclock schedule at step 912. If the present time $t_{PRES}$ is equal to the next event time $t_{NEXT}$ at step 914, the lighting hub 640 adjusts the position $P_{BLIND}$ of the bottom rail 116 to the controlled position $P_{CNTL}(t_{NEXT})$ at the next event time $t_{NEXT}$ at step 916, and adjusts the tilt angle $\theta_{BLIND}$ of the slats 112 to the controlled tilt angle $\theta_{CNTL}(t_{NEXT})$ at the next event time $t_{NEXT}$ at step 918. After controlling the motorized blind systems 610 at steps 916, 918, after determining that there is not a timeclock event at the present time at step 914, or after determining that the timeclock schedule is not enabled at step 910, the lighting hub 640 makes a determination as to whether the present time is equal to the end time $t_{END}$ of the timeclock schedule at step 920. If not, the timeclock schedule execution procedure 900 simply exits. If the present time is equal to the end time $t_{END}$ at step 920, the lighting hub 640 controls the position $P_{BLIND}$ of the bottom rail 116 to a nighttime position $P_{NIGHT}$ (e.g., the fully-lowered position $P_{FL}$) at step 922, controls the tilt angle $\theta_{BLIND}$ of slats 112 to a nighttime angle $\theta_{NIGHT}$ (e.g., such that the slats are in the fully front-tilted position) at step 924, and disables the timeclock schedule at step 926, before the timeclock schedule execution procedure 900 exits.

Therefore, according to the second embodiment of the present invention, the lighting hub 640 controls the motorized blind systems 610 to adjust the positions $P_{BLIND}$ of the bottom rails 116 and the tilt angles $\theta_{BLIND}$ of the slats 112 at times that are spaced apart by multiples of the user-specified minimum time period $T_{MIN}$ between blind adjustments in order to limit the direct sunlight penetration distance $d_{P\text{-}DIR}$ to the maximum direct sunlight penetration distance $d_{P\text{-}DIR\text{-}MAX}$ in the space 700 and to maximize the reflected sunlight penetration distance $d_{P\text{-}REF}$ on the ceiling 716, while minimizing occupant distractions. Since the motorized blind systems 610 in the building may only be adjusted at these specific times (i.e., at the multiples of the user-specified minimum time period $T_{MIN}$), the motorized blind systems will all be adjusted at the same times during the timeclock schedule, thus minimizing occupant distractions. Even adjustments of adjacent motorized blind systems 610 located on different façades 710 (for example, in a corner office) will move at the same times (i.e., at the multiples of the user-specified minimum time period $T_{MIN}$). If the minimum time period $T_{MIN}$ between blind adjustments is chosen to be a logical time period (e.g., one hour), the users of the building will know when to expect automatic adjustments of the motorized blind systems 610, and thus will not be as distracted by the blind adjustment as compared to blind adjustments occurring at random times.

According to the second embodiment of the present invention, the motorized blind systems 610 are controlled such that the bottom rails 116 of all of the motorized blind systems on each of the façades 710 of the building are aligned (i.e., positioned at approximately the same vertical position) at all times during the timeclock schedule. Since all of the motorized blind systems 610 on a façade 710 are adjusted at the same time, the lighting hub 640 will calculate the same controlled position $P_{CNTL}(t)$ for the bottom rail 116 of all of the motorized blind systems on the façade at a specific event time (assuming that all of the motorized blind systems are controlled to limit the direct sunlight penetration distance $d_{P\text{-}DIR}$ to the same desired maximum direct sunlight penetration distance $d_{P\text{-}DIR\text{-}MAX}$). Therefore, the bottom rails 116 of the motorized blind systems 610 on a façade 710 will be aligned independent of differences in the size, shape, or height of the windows 712 of the façade.

According to another embodiment of the present invention, the lighting hub 640 could generate a timeclock schedule in response to a maximum number $N_{MAX}$ of adjustments of the motorized blind systems 610 that may occur during the present day, as well as in response to the minimum time period $T_{MIN}$ that may exist between any two consecutive adjustments of the motorized blind systems. As in the second embodiment, the timeclock schedule provides for control of the motorized blind systems 610 to limit the direct sunlight penetration distance $d_{P\text{-}DIR}$ to be less than the desired maximum direct sunlight penetration distance $d_{P\text{-}DIR\text{-}MAX}$, and to maximize the reflected sunlight penetration distance $d_{P\text{-}REF}$. For example, the maximum number $N_{MAX}$ of blind adjustments may have a minimum value of approximately three. The lighting hub 640 determines if the user-selected maximum number $N_{MAX}$ of blind adjustments or the user-selected minimum time period $T_{MIN}$ between blind adjustments is the limiting factor for determining a movement time $T_{MOVE}$, which will exist between the timeclock schedule events. Accordingly, the user is able to control the maximum number $N_{MAX}$ of blind adjustments and the minimum time period $T_{MIN}$ between blind adjustments in order to minimize distractions of an occupant in the space 700 due to adjustments of the motorized blind systems 610.

In addition, the lighting hubs 640 may be operable to control the motorized roller shades 630 to limit the direct sunlight penetration distance $d_{P\text{-}DIR}$ to the maximum direct sunlight penetration distance $d_{P\text{-}DIR\text{-}MAX}$ in spaces in which the motorized roller shades are installed. An example of a load control system having motorized roller shades operable to control the direct sunlight penetration distance $d_{P\text{-}DIR}$ is described in greater detail in U.S. patent application Ser. No. 12/563,786, filed Sep. 21, 2009, entitled METHOD OF AUTOMATICALLY CONTROLLING A MOTORIZED WINDOW TREATMENT WHILE MINIMIZING OCCUPANT DISTRACTIONS, the entire disclosure of which is hereby incorporated by reference.

While the present invention has been described with reference to the motorized blind systems 110, 610 and the motorized roller shades 120, 630, the concepts of the present invention could be applied to other types of motorized window treatments, such as, for example, draperies, roman shades, cellular shades, tensioned roller shade systems, and roller shade systems having pleated shade fabrics. An example of a motorized drapery system is described in greater detail in commonly-assigned U.S. Pat. No. 6,994,145, issued Feb. 7, 2006, entitled MOTORIZED DRAPERY PULL SYSTEM, the entire disclosure of which is hereby incorporated by reference. An example of a roman shade system is described in greater detail in commonly-assigned U.S. patent application Ser. No. 12/784,096, filed Mar. 20, 2010, entitled MOTORIZED DRAPERY PULL SYSTEM, the entire disclosure of which is hereby incorporated by reference. An example of a tensioned roller shade system is described in greater detail in commonly-assigned U.S. patent application Ser. No. 12/061,802, filed Apr. 3, 2008, entitled SELF-CONTAINED TENSIONED ROLLER SHADE SYSTEM, the entire disclosure of which is hereby incorporated by reference. An example of a roller shade system having a pleated shade fabric is described in greater detail in commonly-assigned U.S. patent application Ser. No. 12/430,458, filed Apr. 27, 2009, entitled ROLLER SHADE SYSTEM HAVING A HEMBAR FOR PLEATING A SHADE FABRIC, the entire disclosure of which is hereby incorporated by reference.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method of automatically controlling a motorized venetian blind system while minimizing occupant distractions, the motorized venetian blind system adapted to control the amount of sunlight entering a space of a building through a window located in a façade of the building by adjusting position of a bottom rail and a tilt angle of rectangular slats that extend across the width of the window to control a direct sunlight penetration distance within the space and a reflected sunlight penetration distance on a ceiling of the space, the method comprising the steps of:

receiving a desired maximum direct sunlight penetration distance and a desired maximum reflected sunlight penetration distance for the space;

building a timeclock schedule having a start time and an end time, the timeclock schedule including a number of timeclock events that will occur between the start time and the end time;

receiving a minimum time period that may occur between any two consecutive timeclock events;

determining, for each of the timeclock events, an event time between the start time and the end time, such that at least the minimum time period exists between the event times of any two consecutive timeclock events;

determining, for each of the timeclock events, a respective bottom rail position to which the bottom rail of the motorized venetian blind system will be controlled at the respective event time, and a respective tilt angle to which the slats of the motorized venetian blind system will be tilted at the respective event time, such that the direct sunlight penetration distance will not exceed the desired maximum direct sunlight penetration distance and the reflected sunlight penetration distance on the ceiling of the space will not exceed the desired maximum reflected penetration distance for all of the events between the start time and the end time of the timeclock schedule; and automatically controlling the motorized venetian blind system according to the timeclock schedule by adjusting the position of bottom rail of the motorized venetian blind system to the respective position of each of the timeclock events at the respective event time, and the tilt angle of the slats of the motorized venetian blind system to the respective tilt angle of each of the timeclock events at the respective event time.

2. The method of claim 1, further comprising the step of:

prior to the step of determining an event time for each of the timeclock events, calculating optimal positions of the bottom rail and optimal tilt angles of the slats at a plurality of different times between the start time and the end time, such that the sunlight penetration distance will not exceed the desired maximum sunlight penetration distance at the plurality of different times and the reflected sunlight penetration distance on the ceiling of the space will not exceed the desired maximum reflected sunlight penetration distance between the start time and the end time.

3. The method of claim 2, further comprising the step of:

receiving a maximum number of movements of the motorized venetian blind system that may occur during the timeclock schedule;

wherein the number of timeclock events of the timeclock schedule does not exceed the maximum number of movements, and at least the minimum time period exists between the event times of any two consecutive timeclock events.

4. The method of claim 2, further comprising the step of:

creating multiple timeclock events between the start time and the end time of the timeclock schedule, each of the timeclock events having respective event times that are spaced apart from each other by multiples of the minimum time period that may occur between any two consecutive timeclock events.

5. The method of claim 2, wherein the step of determining an event time for each of the timeclock events further comprises determining the event times of the timeclock events in response to the optimal positions of the bottom rail and optimal tilt angles of the slats at the plurality of different times between the start time and the end time.

6. The method of claim 2, wherein the step of calculating optimal positions of the motorized venetian blind system and optimal tilt angles for the slats further comprises calculating optimal positions of the motorized venetian blind system and optimal tilt angles for the slats as a function of the longitude and latitude of the location of the building, an angle of the façade with respect to true north, a height of the window, and the present date and time.

7. The method of claim 2, wherein the step of calculating optimal positions of the bottom rail and optimal tilt angles of the slats further comprises calculating optimal positions of the bottom rail and optimal tilt angles of the slats for each minute between the start time and the end time.

8. The method of claim 1, wherein the step of determining, for each of the timeclock events, a respective bottom rail position to which the bottom rail of the motorized venetian blind system will be controlled at the respective event time, and a respective tilt angle to which the slats of the motorized venetian blind system will be tilted at the respective event time further comprises:
  determining, for each of the timeclock events, a respective tilt angle to which the slats of the motorized venetian blind system will be tilted at the respective event time, such that no sunlight shines directly through the slats beyond the desired maximum direct sunlight penetration distance.

9. A load control system for controlling the amount of sunlight entering a space of a building through a window located in a façade of the building to control a direct sunlight penetration distance within the space and a reflected sunlight penetration distance on a ceiling of the space, the load control system comprising:
  a motorized venetian blind system having a bottom rail and a plurality of rectangular slats that extend across the width of the window; and
  a central controller operatively coupled to the motorized venetian blind system, the central controller operable to transmit digital commands to the motorized venetian blind system, the controller further operable to
  receive a desired maximum direct sunlight penetration distance, a desired maximum reflected sunlight penetration distance, and a minimum time period that may occur between any two consecutive movements of the motorized venetian blind system;
  calculate a controlled bottom rail position to which the bottom rail of the motorized venetian blind system should be controlled and a controlled tilt angle to which the slats of the motorized blind venetian system should be tilted during each of a plurality of consecutive time intervals, such that the sunlight penetration distance does not exceed the desired maximum direct sunlight penetration distance and the reflected sunlight penetration distance on the ceiling of the space will not exceed the desired maximum reflected penetration distance during each of the respective time intervals, the time intervals having lengths greater than or equal to the minimum time period that may occur between any two consecutive movements of the motorized venetian blind system; and
  automatically adjust the position of the bottom rail to the controlled bottom rail position and the tilt angle of the slats to the controlled tilt angle at the beginning of each time interval, such that the sunlight penetration distance will not exceed the desired maximum direct sunlight penetration distance and the reflected sunlight penetration distance does not exceed the desired maximum reflected sunlight penetration distance during each of the respective time intervals, and the movements of the motorized venetian blind system are spaced apart by at least the minimum time period that may occur between any two consecutive movements of the motorized venetian blind system.

10. The load control system of claim 9, wherein the controller is operable to calculate optimal positions of the bottom rail and optimal tilt angles of the motorized venetian blind system at a plurality of different times during one of the time intervals, such that the sunlight penetration distance will not exceed the desired maximum direct sunlight penetration distance and the reflected sunlight penetration distance will not exceed the desired maximum sunlight penetration distance during each of the time intervals.

11. The load control system of claim 10, wherein the controller is operable to determine a lowest position of the calculated optimal positions of the bottom rail of the motorized venetian blind system during the one of the time intervals.

12. The load control system of claim 11, wherein the controller is operable to adjust the position of the bottom rail of the motorized venetian blind system at the beginning of the one of the time intervals to the lowest position of the calculated optimal positions of the bottom rail of the motorized venetian blind system during the one of the time intervals.

13. The load control system of claim 9, wherein the controller is operable to calculate the controlled tilt angle to which the slats of the motorized venetian blind system should be tilted during each of a plurality of consecutive time intervals, such that no sunlight shines directly through the slats beyond the desired maximum direct sunlight penetration distance.

14. The load control system of claim 9, wherein the slats of the motorized venetian blind system are flat and reflective.

15. The load control system of claim 9, wherein the sunlight that is reflected off of the slats of the motorized venetian blind system and onto the ceiling of the space is diffuse.

16. The load control system of claim 9, further comprising:
  a daylight sensor mounted to the ceiling of the space;
  wherein the central controller is operable to adjust the tilt angle of the slats to prevent sunlight from being reflected onto the daylight sensor.

* * * * *